(12) United States Patent
Kim

(10) Patent No.: US 10,578,712 B2
(45) Date of Patent: Mar. 3, 2020

(54) INSTALLATION ANGLE DISTINCTION APPARATUS AND DISTINCTION METHOD THEREOF

(71) Applicant: MANDO CORPORATION, Pyeongtaek-si, Gyeonggi-do (KR)

(72) Inventor: Hyun-Wook Kim, Suwon-si (KR)

(73) Assignee: MANDO CORPORATION, Pyeongtaek-si, Gyeonggi-Do (KR)

( * ) Notice: Subject to any disclaimer, the term of this patent is extended or adjusted under 35 U.S.C. 154(b) by 592 days.

(21) Appl. No.: 15/096,814

(22) Filed: Apr. 12, 2016

(65) Prior Publication Data

US 2016/0299217 A1 Oct. 13, 2016

(30) Foreign Application Priority Data

Apr. 13, 2015 (KR) .................. 10-2015-0051645

(51) Int. Cl.
*G01S 7/40* (2006.01)
*G01S 13/93* (2020.01)
(Continued)

(52) U.S. Cl.
CPC .............. *G01S 7/4026* (2013.01); *G01S 7/41* (2013.01); *G01S 13/86* (2013.01); *G01S 13/931* (2013.01);
(Continued)

(58) Field of Classification Search
CPC ........ G01S 7/40; G01S 7/4004; G01S 7/4026; G01S 2007/4034; G01S 2007/4078;
(Continued)

(56) References Cited

U.S. PATENT DOCUMENTS 6,429,804 B1 * 8/2002 Kishida .................. G01S 13/34
340/435

2006/0262008 A1 * 11/2006 Sanyal .................... G01S 13/86
342/120
(Continued)

FOREIGN PATENT DOCUMENTS

CN        1402016 A    3/2003
CN      101006359 A    7/2007
(Continued)

OTHER PUBLICATIONS

Chinese Office Action dated Apr. 2, 2018 in connection with the counterpart Chinese Patent Application No. 2016-102278754, citing the above reference(s).
(Continued)

*Primary Examiner* — Vladimir Magloire
*Assistant Examiner* — Michael W Justice
(74) *Attorney, Agent, or Firm* — Hauptman Ham, LLP

(57) ABSTRACT

Disclosed herein is an installation angle distinction apparatus including at least: an Input unit which inputs a current relative distance value, current relative velocity value and current horizontal angle value of a stationary object; an estimation unit which estimates a vertical height of the stationary object, and estimates vertical height values of the stationary object at each of predetermined time points for different distances and estimates a current vertical installation angle value of the detector; a determination unit which determinates that the current vertical installation angle of the detector is abnormal when the estimated current vertical installation angle value is deviated from a reference vertical installation angle value range preset; and a control unit which receives the current relative distance value, the current relative velocity value, and the current horizontal angle value, transmits an estimation command and a determination command to the estimation unit the determination unit, respectively.

15 Claims, 24 Drawing Sheets

(51) Int. Cl.
*G01S 13/86* (2006.01)
*G01S 7/41* (2006.01)
*G01S 13/931* (2020.01)

(52) U.S. Cl.
CPC ............. *G01S 2007/4034* (2013.01); *G01S 2013/9353* (2013.01); *G01S 2013/9375* (2013.01)

(58) Field of Classification Search
CPC .. G01S 2007/406; G01S 13/86; G01S 13/874; G01S 13/876; G01S 13/931; G01S 2013/9353; G01S 2013/9375; G01S 7/41
See application file for complete search history.

(56) References Cited

U.S. PATENT DOCUMENTS

| | | | | |
|---|---|---|---|---|
| 2010/0253541 A1* | 10/2010 | Seder | .................... | G01S 13/723 340/905 |
| 2011/0074620 A1* | 3/2011 | Wintermantel | ......... | G01S 7/032 342/70 |
| 2011/0156955 A1* | 6/2011 | Jeong | .................... | G01S 13/931 342/359 |
| 2016/0161597 A1* | 6/2016 | Treptow | ................ | G01S 7/4026 342/174 |
| 2016/0209504 A1* | 7/2016 | Steinhauer | ................ | G01S 3/20 |
| 2016/0343248 A1* | 11/2016 | Mende | .................... | G01S 13/87 |
| 2017/0229019 A1* | 8/2017 | Ichinose | ................ | G08G 1/166 |

FOREIGN PATENT DOCUMENTS

| | | |
|---|---|---|
| CN | 101685007 A | 3/2010 |
| CN | 102042821 A | 5/2011 |
| CN | 102679953 A | 9/2012 |
| DE | 102008054579 A1 | 6/2010 |
| JP | 2004045428 A | 2/2004 |
| JP | 2012194169 A | 10/2012 |
| JP | 2014153256 A | 8/2014 |
| JP | 5626151 B2 | 11/2014 |
| WO | WO-2014187597 A1 * 11/2014 ........... G01S 7/4026 |

OTHER PUBLICATIONS

Korean Notice of Allowance for corresponding Korean Patent Application No. 10-2015-0051645 dated Jul. 27, 2016, citing the above reference(s).

* cited by examiner (a)

(INSTALLATION ANGLE 0°)

(b)

(INSTALLATION ANGLE α°)

INSTALLATION ANGLE DISTINCTION APPARATUS AND DISTINCTION METHOD THEREOF

CROSS-REFERENCE TO RELATED APPLICATION

This application claims the benefit of Korean Patent Application No. 2015-0051645, filed on Apr. 13, 2015 in the Korean Intellectual Property Office, the disclosure of which is incorporated herein by reference.

BACKGROUND

1. Field

The present disclosure relates to an installation angle distinction apparatus and a distinction method thereof.

2. Description of the Related Art

Generally, a conventional vehicular radar was a detector for detecting a stationary object while driving.

However, the conventional vehicular radar was installed adjacent to a bumper and thus had an installation angle thereof twisted due to an impact from an external factor, thereby had a limitation in accurately detecting a stationary object.

For example, when a vertical installation angle of the conventional vehicular radar was twisted, a range of detecting a stationary object was shortened, and there was a limitation in accurately detecting stationary objects at a higher place including a pedestrian overpass, a signpost, etc.

Consequently, studies on an improved installation angle distinction apparatus and a distinction method thereof capable of preventing a traffic accident by efficiently determining an installation angle of a detector such as a vehicular radar have continuously been carried out recently.

In addition, studies on an improved installation angle distinction apparatus and a distinction method thereof capable of improving reliability of a detector by suppressing anxiety about a current position of the detector, preventing a traffic accident by inducing cautious driving of a driver, and suppressing an increase in the maintenance and repair cost for maintaining and repairing a vehicle while improving efficiency and convenience of driving have continuously been carried out recently.

SUMMARY

An embodiment of the present disclosure is directed to providing an installation angle distinction apparatus and a distinction method thereof capable of efficiently determining an installation angle.

In addition, an embodiment of the present disclosure is directed to providing an installation angle distinction apparatus and a distinction method thereof capable of preventing a traffic accident by inducing cautious driving of a driver.

In addition, an embodiment of the present disclosure is directed to providing an installation angle distinction apparatus and a distinction method thereof capable of preventing a traffic accident while improving efficiency in driving.

In addition, an embodiment of the present disclosure is directed to providing an installation angle distinction apparatus and a distinction method thereof capable of improving convenience in driving while inducing cautious driving of a driver.

In addition, an embodiment of the present disclosure is directed to providing an installation angle distinction apparatus and a distinction method thereof capable of preventing a traffic accident while improving reliability of a detector.

In addition, an embodiment of the present disclosure is directed to providing an installation angle distinction apparatus and a distinction method thereof capable of suppressing anxiety about a current position of a detector while inducing cautious driving of a driver.

In addition, an embodiment of the present disclosure is directed to providing an installation angle distinction apparatus and a distinction method thereof capable of preventing a traffic accident while suppressing an increase in the maintenance and repair cost.

In accordance with an aspect of the present invention, an installation angle distinction apparatus includes: an Input unit which inputs a current relative distance value, a current relative velocity value and a current elevation angle value of a stationary object which are detected by detector while driving, an estimation unit which estimates a vertical height of the stationary object by using correlations between the current relative distance value, the current relative velocity value and the current elevation angle value of the stationary object which are inputed, and estimates vertical height values of the stationary object at each of predetermined time points for different distances based on the vertical height of the stationary object and estimates a current vertical installation angle value of the detector based on the vertical height values of the stationary object at each of predetermined time points, a determination unit which determinates that the current vertical installation angle of the detector is abnormal when the estimated current vertical installation angle value is deviated from a reference vertical installation angle value range preset; and a control unit which receives the current relative distance value, the current relative velocity value, and the current elevation angle of the stationary object, transmits an estimation command to the estimation unit, and transmits a determination command to the determination unit.

The input unit may be inputed the current relative distance value, the current relative velocity value, and the current elevation angle of the stationary object detected by the detector at each of the predetermined time points while driving.

The estimation unit may estimate the current vertical installation angle value of the detector accumulated at each of the predetermined time points based on the estimated vertical height values of the stationary object at each of the predetermined time points for the different distances.

The apparatus may further comprise a first identification unit which identifies that the current vertical installation angle of the detector is abnormal when the estimated current vertical installation angle value is deviated from the reference vertical installation angle value range preset.

The apparatus may further comprise a first driving unit which drives a velocity adjuster in accordance with controlling the vehicle is driven by lowering the current velocity to be within a preset target velocity level range when the estimated current vertical installation angle value is deviated from the reference vertical installation angle value range.

The apparatus may further comprise a second identification unit which identifies the current velocity is lowered according to the target velocity level range while driving the velocity adjuster.

The apparatus may further comprise a second driving unit which drives an installation angle adjuster to compensate the current vertical installation angle value from the detector within a preset target vertical installation angle value range when the current vertical installation angle value is deviated from the reference vertical installation angle value range.

The apparatus may further comprise a third identification unit which identifies the current vertical installation angle value from the detector is compensated within the target vertical installation angle value range while driving the installation angle adjuster.

The apparatus may further comprise a first communication unit which communicates with a GPS and, transmits a communication signal to be searched by the GPS for information on locations of nearby vehicle maintenance and repair centers when the estimated current vertical installation angle value is deviated from the reference vertical installation angle value range; and a fourth identification unit which identifies the information on the locations of the nearby vehicle maintenance and repair centers searched.

The apparatus may further comprise a first selection unit which selects a desired piece of information on a location of a vehicle maintenance and repair center from the information on the locations of the nearby vehicle maintenance and repair centers identified; and a third driving unit which transmits a navigation driving signal to a navigation device to guide a vehicle to arrive at a vehicle maintenance and repair center corresponding to the selected piece of information on a location of a vehicle maintenance and repair center.

The apparatus may further comprise a second communication unit which communicates with the GPS in accordance with controlling by the control unit, and communicates with a terminal of a nearby vehicle maintenance and repair center searched by the GPS when the estimated current vertical installation angle value is deviated from the reference vertical installation angle value range; a fifth identification unit which identifies information on whether to accept a dispatch order requested from the terminal of the nearby vehicle maintenance and repair center searched by the GPS and a second selection unit which selects to request the dispatch order or selects not to request the dispatch order from the information on whether to accept the identified dispatch order.

The controller may end the detector when the current vertical installation angle is determined to be abnormal.

The detector may comprise a radar sensor.

In accordance with another aspect of the present invention, an installation angle distinction method includes: Inputing a current relative distance value, a current relative velocity value and a current elevation angle value of a stationary object which are detected by a detector while driving; estimating a vertical height of the stationary object by using correlations between the current relative distance value, the current relative velocity value and the current elevation angle of the stationary object which are inputed, and estimating vertical height values of the stationary object at each of predetermined time points for different distances based on the vertical height of the stationary object and estimating a current vertical installation angle value of the detector based on the vertical height values of the stationary object at each of predetermined time points; and determinating that the current vertical installation angle of the detector is abnormal when the current vertical installation angle value which are estimated is deviated from a reference vertical installation angle value range preset.

The method may be ending the detector when the current vertical installation angle is determined to be abnormal.

DETAILED DESCRIPTION

Figure 1:
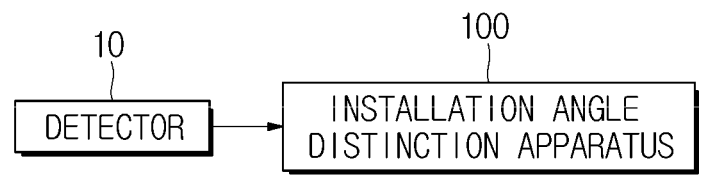
FIG. 1 is a block diagram illustrating a state in which an installation angle distinction apparatus is connected to a detector in accordance with a first embodiment of the present invention.

Hereinafter, embodiments of the present disclosure will be described in detail with reference to the accompanying drawings. The embodiments below are provided to fully describe the spirit of the present disclosure to those of ordinary skill in the art to which the present disclosure pertains. The present disclosure is not limited to the embodiments provided herein and may become concrete in other forms. In the drawings, parts unrelated to the description of the present disclosure will be omitted to clarify the present disclosure, and sizes of elements may be shown somewhat exaggerated to assist in understanding the present disclosure.

Figure 2:
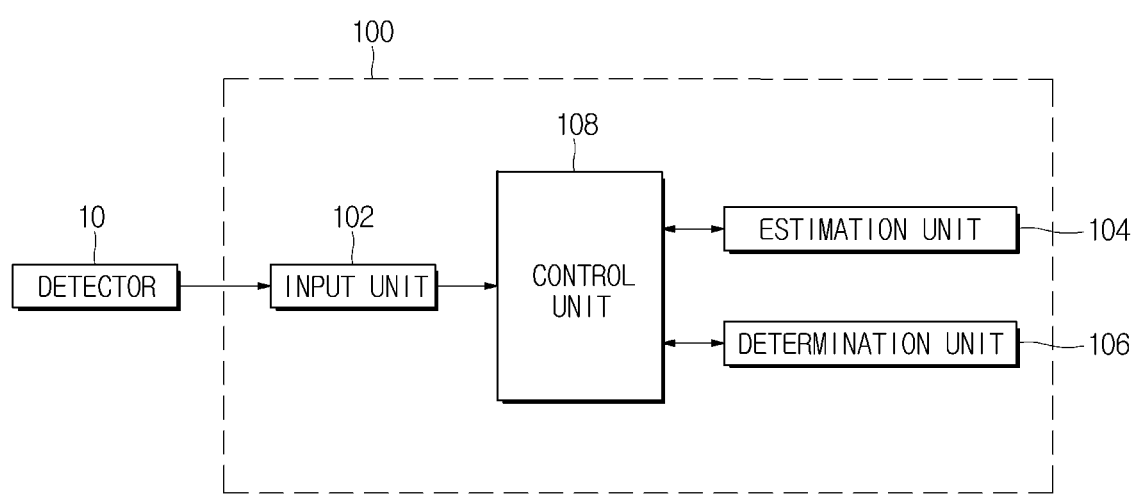
FIG. 2 is a block diagram illustrating an example of the installation angle distinction apparatus of FIG. 1.

FIG. 1 is a block diagram illustrating a state in which an installation angle distinction apparatus according to a first embodiment is connected to a detector, and FIG. 2 is a block diagram illustrating an example of the installation angle distinction apparatus illustrated in FIG. 1.

Figure 3:
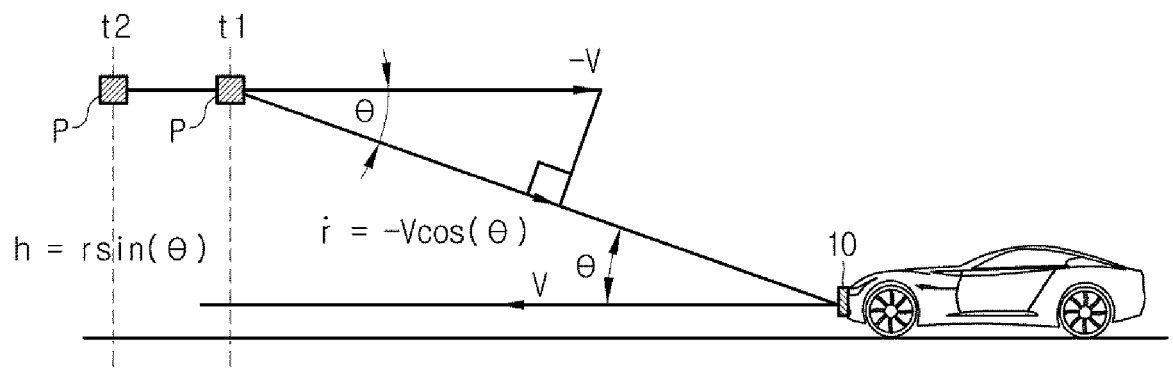
FIG. 3 is a view illustrating a process for calculating a vertical height of a stationary object.
Figure 4:
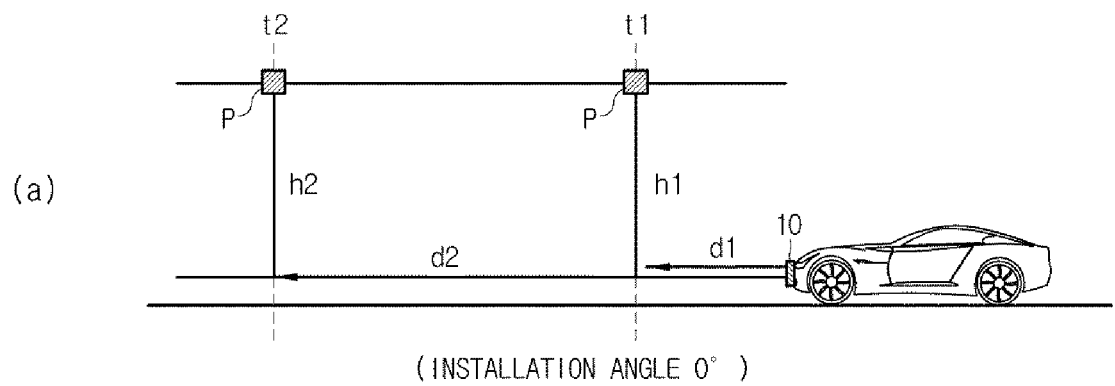
FIG. 4 is a view illustrating a process for estimating a current vertical installation angle value of a detector illustrated in FIG. 3.
Figure 4:
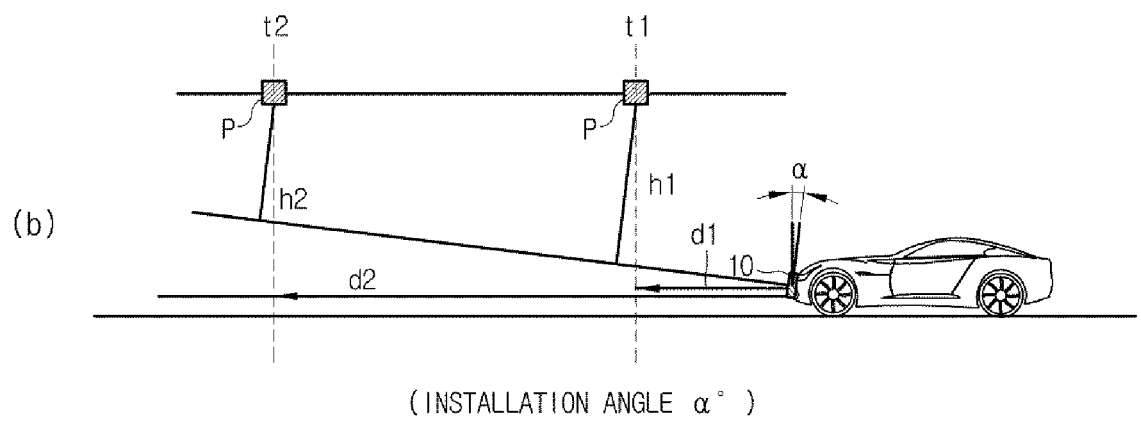

FIG. 3 is a view illustrating a process for calculating a vertical height of a stationary object, and FIG. 4 is a view illustrating a process for estimating a current vertical installation angle value of a detector illustrated in FIG. 3.

Referring to FIGS. 1 to 4, an installation angle distinction apparatus 100 according to a first embodiment of the present disclosure includes an input unit 102, an estimation unit 104, a determination unit 106, and a control unit 108.

The input unit 102 is input with a current relative distance value ($\dot{r}\cdot\Delta t$), a current relative velocity value ($\dot{r}=-v\cos(\theta)$), and a current elevation angle value ($\theta$) of a stationary object P detected by a detector 10 of a vehicle while driving in accordance with controlling by the control unit 108 to be described below.

For example, as illustrated in FIGS. 2 and 3, the input unit 102 may be input with the current relative distance value ($\dot{r}\cdot\Delta t$), the current relative velocity value ($\dot{r}=-v\cos(\theta)$), and the current elevation angle value ($\theta$) of the stationary object P detected by the detector 10 of the vehicle at predetermined time points t1 and t2 while driving in accordance with the controlling by the control unit 108 to be described below.

Here, although not illustrated, the detector 10 may be a radar (not shown) applied to an adaptive cruise control (ACC) system (not shown), an autonomous emergency braking (AEB) system (not shown), and a forward collision warning (FCW) system (not shown) but is not limited thereto and may be any detector for detecting a relative distance, a relative velocity, and a elevation angle of the stationary object P.

Here, although not illustrated, the detector 10 may improve efficiency of detection by detecting when the current relative velocity of the stationary object P is lower than a reference relative velocity range and may improve efficiency of detection by detecting a central position of the stationary object P.

Here, although not illustrated, the stationary object P may be a structure (not shown) installed at a higher place, and the structure (not shown) installed at the higher place may be provided within a tunnel (not shown).

The estimation unit 104 uses correlations between the current relative distance value ($\dot{r}\cdot\Delta t$), the current relative velocity value ($\dot{r}=-v\cos(\theta)$), and the current elevation angle value ($\theta$) of the stationary object P input to the input unit 102 to estimate a vertical height ($h=r\sin(\theta)$) of the stationary object P.

For example, as illustrated in FIGS. 2 and 3, the estimation unit 104 may use the correlations between the current relative distance value ($\dot{r}\cdot\Delta t$), the current relative velocity value ($\dot{r}=-v\cos(\theta)$), and the current elevation angle value ($\theta$) of the stationary object P input to the input unit 102 to estimate the vertical height ($h=r\sin(\theta)$) of the stationary object P at each of the predetermined time points t1 and t2.

In addition, as illustrated in FIGS. 2 to 4, the estimation unit 104 estimates vertical height values $h_1$ and $h_2$ of the stationary object P at each of the predetermined time points t1 and t2 for different distances driven $d_1$ and $d_2$ based on the estimated vertical height ($h=r\sin(\theta)$) of the stationary object P.

In addition, as illustrated in FIGS. 2 and 4, the estimation unit 104 estimates a current vertical installation angle value ($\alpha$) of the detector 10 based on the estimated vertical height values $h_1$ and $h_2$ of the stationary object P at each of the predetermined time points t1 and t2 for the different distances driven $d_1$ and $d_2$.

For example, the estimation unit 104 may estimate the current vertical installation angle value ($\alpha$) of the detector 10 accumulated at each of the predetermined time points t1 and t2 based on the estimated vertical height values $h_1$ and $h_2$ of the stationary object P at each of the predetermined time points t1 and t2 for the different distances driven $d_1$ and $d_2$.

That is, as in <Equation 1> below, a difference between the vertical height values $h_1$ and $h_2$ of the stationary object P may be expressed in the form of a product of a difference between the different distances driven $d_1$ and $d_2$ and tan ($\alpha$) to which the current vertical installation angle value ($\alpha$) of the detector 10 is applied, and as in <Equation 2> below, the current vertical installation angle value ($\alpha$) of the detector 10 may be re-expanded.

$$(h_1-h_2)=(d_1-d_2)\times\tan(\alpha) \qquad \text{<Equation 1>}$$

$$\alpha = \tan^{-1}\left(\frac{h_1-h_2}{d_1-d_2}\right) \qquad \text{<Equation 2>}$$

When the determination unit 106 determines that the current vertical installation angle value ($\alpha$) estimated by the estimation unit 104 is deviated from a reference vertical installation angle value range preset in the control unit 108, the determination unit 106 determinates that the current vertical installation angle of the detector 10 is abnormal in accordance with the controlling by the control unit 108.

For example, as illustrated in FIGS. 2 and 4, when the determination unit 106 determinates that the current vertical installation angle value ($\alpha$) estimated by the estimation unit 104 is deviated from 0° which is a reference vertical installation angle value range preset in the control unit 108, the determination unit 106 may determine that the current vertical installation angle of the detector 10 is abnormal in accordance with the controlling by the control unit 108.

In addition, when the current vertical installation angle of the detector 10 is determined to be abnormal in accordance with the controlling by the control unit 108, the operation of the radar (not shown) included in the detector 10 may be aborted or ended.

The control unit 108 receives the current relative distance value ($\dot{r}\cdot\Delta t$), the current relative velocity value ($\dot{r}=-v\cos(\theta)$), and the current elevation angle value ($\theta$) of the stationary object P from the input unit 102, transmits an estimation command to the estimation unit 104, and transmits a determination command to the determination unit 106.

Here, although not illustrated, the input unit 102, the estimation unit 104, the determination unit 106, and the control unit 108 may be provided to a general electric control unit (ECU, not shown) for controlling an overall operation of a vehicle by a main computer applied to the vehicle, inputting determined and detected information, and estimating the current vertical installation angle value ($\alpha$) of the detector 10.

In addition, although not illustrated, the input unit 102, the estimation unit 104, the determination unit 106, and the control unit 108 may be provided to a general micro control unit (MCU, not shown) for controlling an overall operation of a vehicle by a processor, a memory, and an input/output device disposed in one chip, inputting determined and detected information, and estimating the current vertical installation angle value ($\alpha$) of the detector 10.

In addition, the input unit 102, the estimation unit 104, the determination unit 106, and the control unit 108 are not limited thereto, and may be any controlling means, determining means, inputting means, and estimating means each capable of controlling an overall operation of a vehicle, inputting determined and detected information, and estimating the current vertical installation angle value ($\alpha$) of the detector 10.

Here, the input unit 102, the estimation unit 104, the determination unit 106, and the control unit 108 may be provided to the ECU (not shown) or the MCU (not shown) in an integrated form or may be provided to the ECU (not shown) or the MCU (not shown) in a separate form.

An installation angle distinction method for distinguishing an installation angle using the installation angle distinction apparatus 100 according to the first embodiment of the present disclosure may be described with reference to FIG. 5 below.

Figure 5:
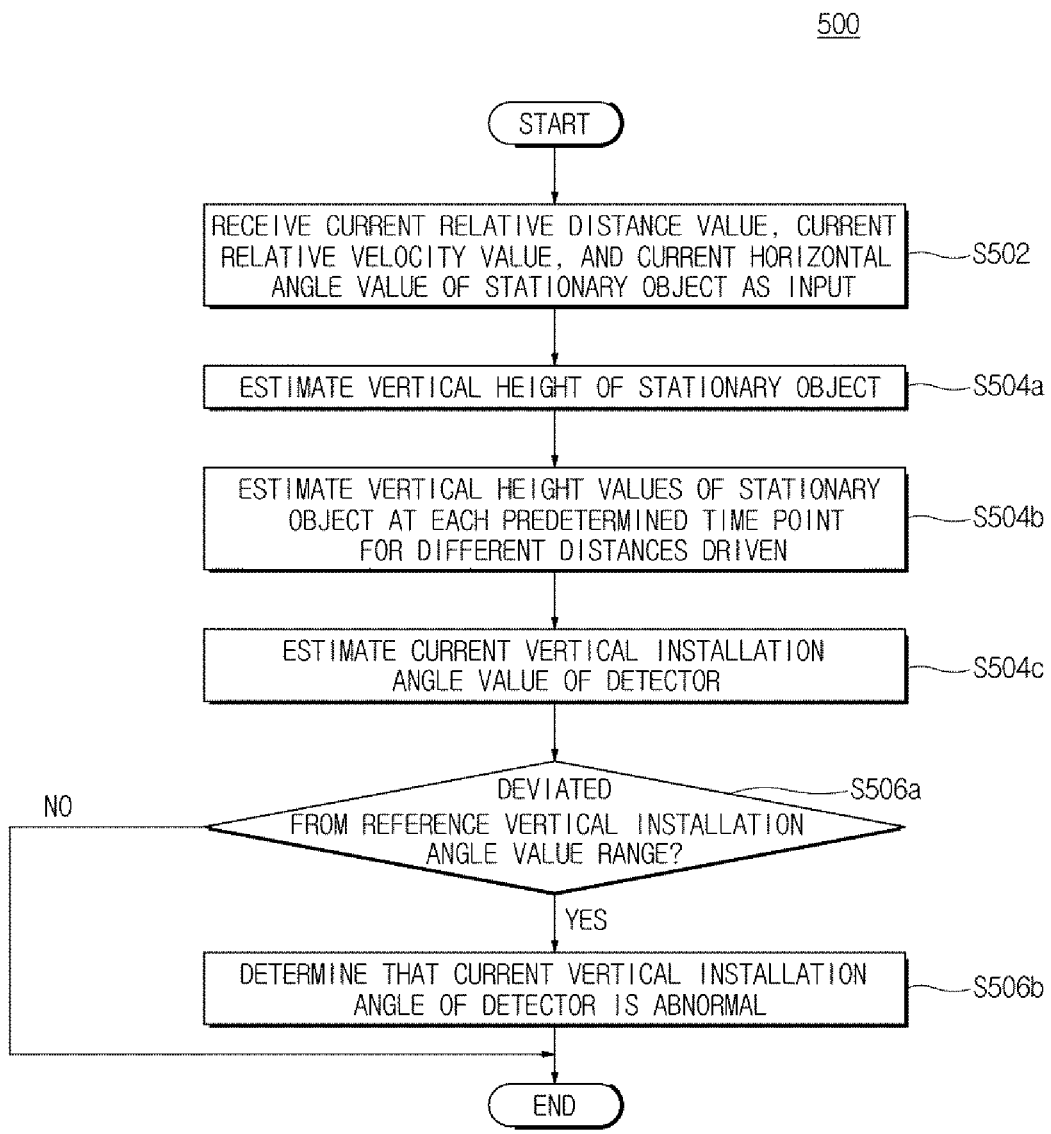
FIG. 5 is a flow chart illustrating an example of an installation angle distinction apparatus in accordance with a first embodiment of the present invention.

FIG. 5 is a flow chart illustrating an example of an installation angle distinction method using the installation angle distinction apparatus according to the first embodiment of the present disclosure.

Referring to FIG. 5, an installation angle distinction method 500 using the installation angle distinction apparatus (100 in FIGS. 1 and 2) according to the first embodiment of the present disclosure includes an inputting step (S502), estimating steps (S504a, S504b, S504c), and determining steps (S506a, S506b).

First, in the inputting step (S502), the current relative distance value ($\dot{r}\cdot\Delta t$ in FIG. 3), the current relative velocity value ($\dot{r}=-v\cos(\theta)$ in FIG. 3), and the current elevation angle value ($\theta$ in FIG. 3) of the stationary object (P in FIG. 3) detected by the detector (10 in FIG. 2) of the vehicle while driving are input to the input unit (102 in FIG. 2) in accordance with the controlling by the control unit (108 of FIG. 2).

For example, in the inputting step (S502), the current relative distance value ($\dot{r}\cdot\Delta t$ in FIG. 3), the current relative velocity value ($\dot{r}=-v\cos(\theta)$ in FIG. 3), and the current elevation angle value ($\theta$ in FIG. 3) of the stationary object (P in FIG. 3) detected by the detector (10 in FIG. 2) at each of the predetermined time points (t1 and t2 in FIG. 3) while driving may be input to the input unit (102 in FIG. 2) in accordance with the controlling by the control unit (108 of FIG. 2).

Then, in the estimating step (S504a), the correlations between the current relative distance value ($\dot{r}\cdot\Delta t$ in FIG. 3), the current relative velocity value ($\dot{r}=-v\cos(\theta)$ in FIG. 3), and the current elevation angle value ($\theta$ in FIG. 3) of the stationary object (P in FIG. 3) input to the input unit (102 in FIG. 2) are used to estimate the vertical height (h=r sin($\theta$) in FIG. 3) of the stationary object (P in FIG. 3) by the estimation unit (104 in FIG. 2) in accordance with the controlling by the control unit (108 of FIG. 2).

For example, in the estimating step (S504a), the correlations between the current relative distance value ($\dot{r}\cdot\Delta t$ in FIG. 3), the current relative velocity value ($\dot{r}=-v\cos(\theta)$ in FIG. 3), and the current elevation angle value ($\theta$ in FIG. 3) of the stationary object (P in FIG. 3) input to the input unit (102 in FIG. 2) may be used to estimate the vertical height (h=r sin($\theta$) in FIG. 3) of the stationary object (P in FIG. 3) by the estimation unit (104 in FIG. 2) at each of the predetermined time points (t1 and t2 in FIG. 3) in accordance with the controlling by the control unit (108 in FIG. 2).

Then, in the estimating step (S504b), the vertical height values ($h_1$ and $h_2$ in FIG. 4) of the stationary object (P in FIG. 4) at each of the predetermined time points (t1 and t2 in FIG. 4) for the different distances driven ($d_1$ and $d_2$ in FIG. 4) are estimated by the estimation unit (104 in FIG. 2) based on the vertical height (h=r sin($\theta$) in FIG. 3) of the stationary object (P in FIG. 3) estimated by the estimation unit (104 in FIG. 2) in accordance with the controlling by the control unit (108 in FIG. 2).

Then, in the estimating step (S504c), the current vertical installation angle value ($\alpha$ in FIG. 4) of the detector (10 in FIG. 2) is estimated by the estimation unit (104 in FIG. 2) based on the vertical height values ($h_1$ and $h_2$ in FIG. 4) of the stationary object (P in FIG. 4) at each of the predetermined time points (t1 and t2 in FIG. 4) for the different distances driven ($d_1$ and $d_2$ in FIG. 4) estimated by the estimation unit (104 in FIG. 2) in accordance with the controlling by the control unit (108 in FIG. 2).

For example, in the estimating step (S504c), the current vertical installation angle value ($\alpha$ in FIG. 4) of the detector (10 in FIG. 2) accumulated at each of the predetermined time points (t1 and t2 in FIG. 4) may be estimated by the estimation unit (104 in FIG. 2) based on the vertical height values ($h_1$ and $h_2$ in FIG. 4) of the stationary object (P in FIG. 4) at each of the predetermined time points (t1 and t2 in FIG. 4) for the different distances driven ($d_1$ and $d_2$ in FIG. 4) estimated by the estimation unit (104 in FIG. 2) in accordance with the controlling by the control unit (108 in FIG. 2).

Then, in the determining steps (S506a, S506b), when the current vertical installation angle value ($\alpha$ in FIG. 4) estimated by the estimation unit (104 in FIG. 2) is determined by the determination unit (106 in FIG. 2) to be deviated from the reference vertical installation angle value range preset in the control unit (108 in FIG. 2) (S506a), the determination unit (106 in FIG. 2) determines that the current vertical installation angle of the detector (10 in FIG. 2) is abnormal in accordance with the controlling by the control unit (108 in FIG. 2) (S506*b*).

In addition, although not illustrated, when the current vertical installation angle of the detector 10 is determined to be abnormal in accordance with the controlling by the control unit 108, the operation of the radar (not shown) included in the detector 10 may be aborted or ended.

For example, in the determining steps (S506*a*, S506*b*), when the current vertical installation angle value ($\alpha$ in FIG. 4) estimated by the estimation unit (104 in FIG. 2) is determined by the determination unit (106 in FIG. 2) to be deviated from 0° which is a reference vertical installation angle value range preset in the control unit (108 in FIG. 2) (S506*a*), the determination unit (106 in FIG. 2) may determine that the current vertical installation angle of the detector (10 in FIG. 2) is abnormal in accordance with the controlling by the control unit (108 in FIG. 2) (S506*b*).

As above, the installation angle distinction apparatus 100 and the distinction method 500 thereof according to the first embodiment of the present disclosure include the input unit 102, the estimation unit 104, the determination unit 106, and the control unit 108 to perform the inputting step (S502), the estimating steps (S504*a*, S504*b*, S504*c*), and the determining steps (S506*a*, S506*b*).

Consequently, the installation angle distinction apparatus 100 and the distinction method 500 thereof according to the first embodiment of the present disclosure may estimate the current vertical installation angle value ($\alpha$ in FIG. 4) of the detector 10 to determine an installation angle, thereby efficiently determining the installation angle.

Figure 6:
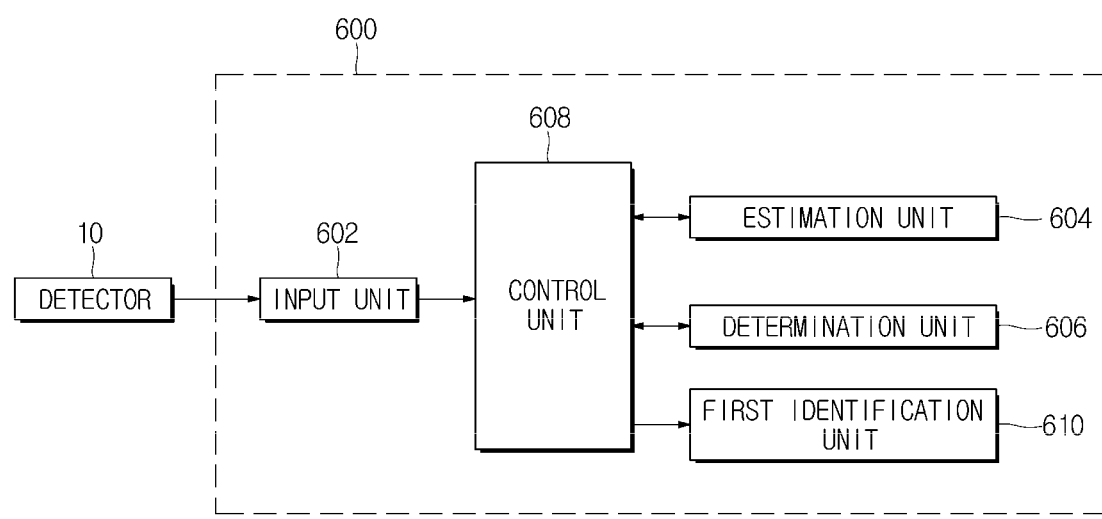
FIG. 6 is a block diagram illustrating an example of an installation angle distinction apparatus according to a second embodiment of the present disclosure

FIG. 6 is a block diagram illustrating an example of an installation angle distinction apparatus according to a second embodiment of the present disclosure.

Referring to FIG. 6, same as the installation angle distinction apparatus (100 in FIG. 2) according to the first embodiment, an installation angle distinction apparatus 600 according to the second embodiment of the present disclosure includes an input unit 602, an estimation unit 604, a determination unit 606, and a control unit 608.

Since functions and systematic correlations of the input unit 602, the estimation unit 604, the determination unit 606, and the control unit 608 of the installation angle distinction apparatus 600 according to the second embodiment of the present disclosure are the same as the functions and systematic correlations of the input unit (102 in FIG. 2), the estimation unit (104 in FIG. 2), the determination unit (106 in FIG. 2), and the control unit (108 in FIG. 2) of the installation angle distinction apparatus (100 in FIG. 2) according to the first embodiment, additional explanations of each of the elements will be omitted below.

Here, the installation angle distinction apparatus 600 according to the second embodiment of the present disclosure further includes a first identification unit 610.

That is, when the current vertical installation angle value ($\alpha$ in FIG. 4) estimated by the estimation unit 604 is determined by the determination unit 606 to be deviated from the reference vertical installation angle value range, the first identification unit 610 identifies that the current vertical installation angle of the detector 10 is abnormal in accordance with controlling by the control unit 608.

Here, although not illustrated, the first identification unit 610 may include at least one among an alarm (not shown), a speaker (not shown), and a light-emitting member (not shown) provided for a driver to identify information or state of a vehicle to identify that the current vertical installation angle of the detector 10 is abnormal by at least one operation among an alarming operation of the alarm (not shown), a voice operation of the speaker (not shown), and a light-emitting operation of the light-emitting member (not shown).

An installation angle distinction method for distinguishing an installation angle using the installation angle distinction apparatus 600 according to the second embodiment of the present disclosure may be described with reference to FIG. 7 below.

Figure 7:
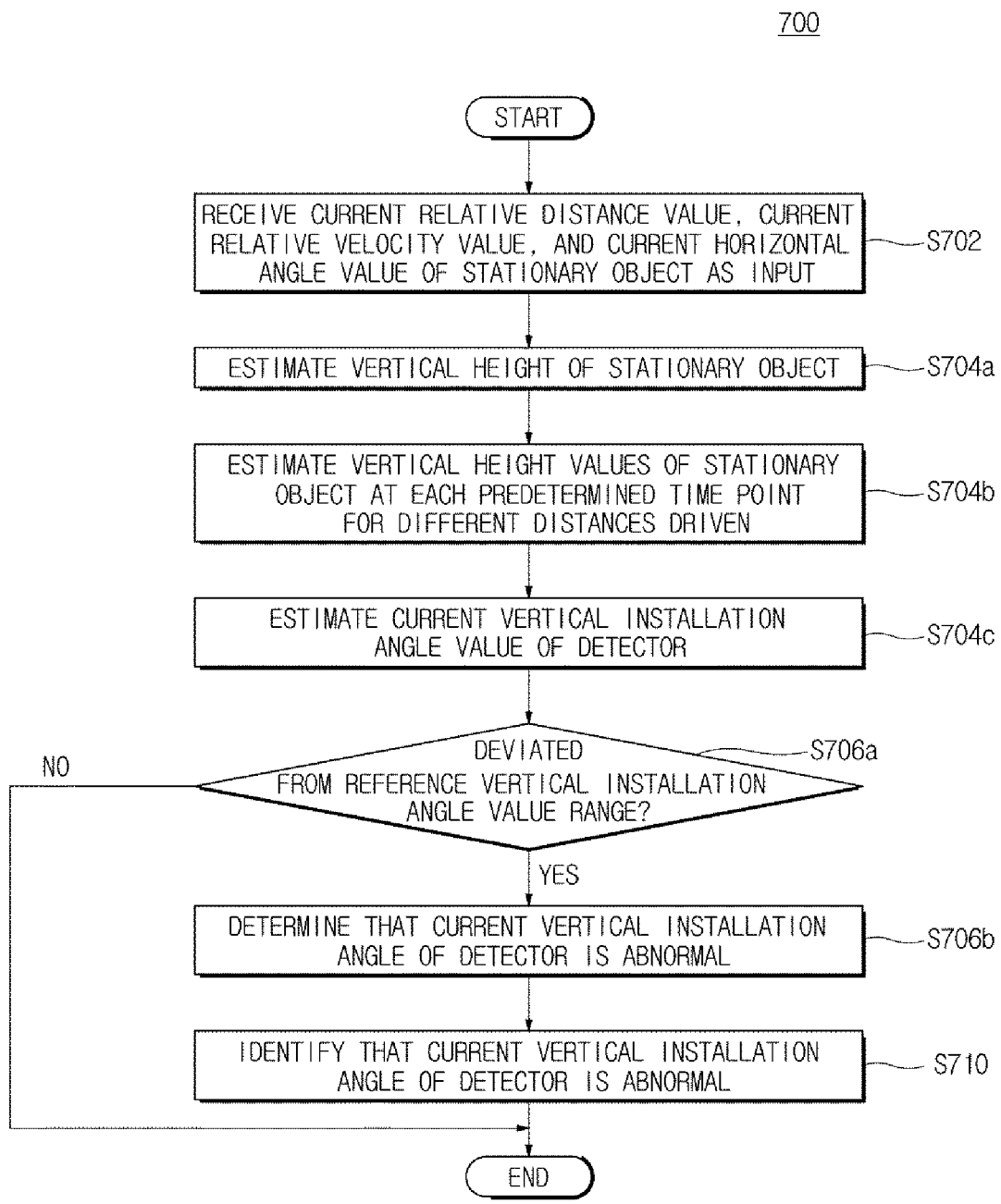
FIG. 7 is a flow chart illustrating an example of an installation angle distinction method using the installation angle distinction apparatus according to the second embodiment of the present disclosure.

FIG. 7 is a flow chart illustrating an example of an installation angle distinction method using the installation angle distinction apparatus according to the second embodiment of the present disclosure.

Referring to FIG. 7, same as the installation angle distinction method (500 in FIG. 5) using the installation angle distinction apparatus (100 in FIG. 2) according to the first embodiment, the installation angle distinction method 700 using the installation angle distinction apparatus (600 in FIG. 6) according to the second embodiment of the present disclosure includes an inputting step (S702), estimating steps (S704*a*, S704*b*, S704*c*), and determining steps (S706*a*, S706*b*).

Since functions and systematic correlations of the inputting step (S702), the estimating steps (S704*a*, S704*b*, S704*c*), and the determining steps (S706*a*, S706*b*) of the installation angle distinction method 700 using the installation angle distinction apparatus (600 in FIG. 6) according to the second embodiment of the present disclosure are the same as the functions and systematic correlations of the inputting step (S502 in FIG. 5), the estimating steps (S504*a*, S504*b*, S504*c* in FIG. 5), and the determining steps (S506*a*, S506*b* in FIG. 5) of the installation angle distinction method (500 in FIG. 5) using the installation angle distinction apparatus (100 in FIG. 2) according to the first embodiment, additional explanations of each of the steps will be omitted below.

Here, the installation angle distinction method 700 using the installation angle distinction apparatus (600 in FIG. 6) according to the second embodiment of the present disclosure further includes a first identifying step (S710).

For example, the first identifying step (S710) may be performed after the determining step (S706*b*).

In another example, although not illustrated, a first identification step (not shown) may be performed by being synchronized with the determining step (S706*b*).

That is, when the current vertical installation angle value ($\alpha$ in FIG. 4) estimated by the estimation unit (604 in FIG. 6) is determined by the determination unit (606 in FIG. 6) to be deviated from the reference vertical installation angle value range, the first identifying step (S710) identifies by the first identification unit (610 in FIG. 6) that the current vertical installation angle of the detector (10 in FIG. 6) is abnormal in accordance with controlling by the control unit (608 in FIG. 6).

As above, the installation angle distinction apparatus 600 and the distinction method 700 thereof according to the second embodiment of the present disclosure include the input unit 602, the estimation unit 604, the determination unit 606, the control unit 608, and the first identification unit 610 to perform the inputting step (S702), the estimating steps (S704*a*, S704*b*, S704*c*), the determining steps (S706*a*, S706*b*), and the first identifying step (S710).

Consequently, the installation angle distinction apparatus 600 and the distinction method 700 thereof according to the second embodiment of the present disclosure may estimate the current vertical installation angle value ($\alpha$ in FIG. 4) of the detector 10 to determine an installation angle, thereby efficiently determining the installation angle.

In addition, when the current vertical installation angle value ($\alpha$ in FIG. 4) deviates from the reference vertical installation angle value range, the installation angle distinction apparatus 600 and the distinction method 700 thereof according to the second embodiment of the present disclosure may identify that the current vertical installation angle of the detector 10 is abnormal.

Consequently, the installation angle distinction apparatus 600 and the distinction method 700 thereof according to the second embodiment of the present disclosure may allow a driver to recognize that the current vertical installation angle of the detector 10 is abnormal such that cautious driving of the driver may be induced and a traffic accident may be prevented.

In addition, the installation angle distinction apparatus 600 and the distinction method 700 thereof according to the second embodiment of the present disclosure may allow a driver to abort or end the operation of the radar (not shown) included in the detector 10 when the current vertical installation angle of the detector 10 is abnormal.

Figure 8:
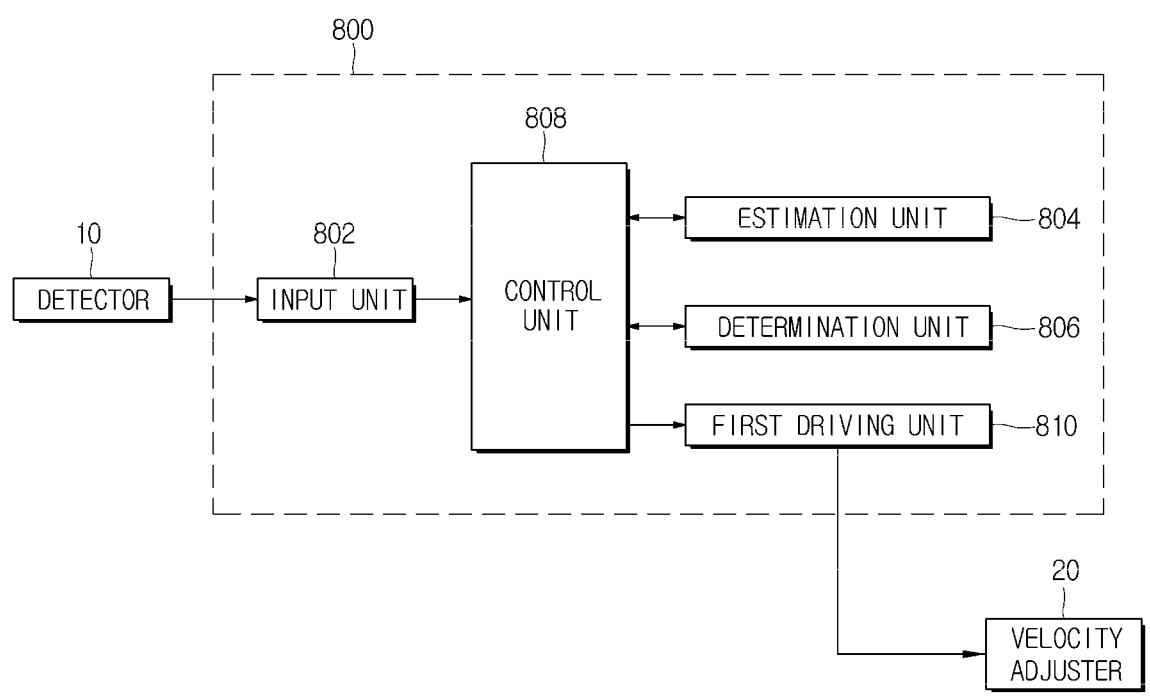
FIG. 8 is a block diagram illustrating an example of an installation angle distinction apparatus according to a third embodiment of the present disclosure.

FIG. 8 is a block diagram illustrating an example of an installation angle distinction apparatus according to a third embodiment of the present disclosure.

Referring to FIG. 8, same as the installation angle distinction apparatus (100 in FIG. 2) according to the first embodiment, an installation angle distinction apparatus 800 according to the third embodiment of the present disclosure includes an input unit 802, an estimation unit 804, a determination unit 806, and a control unit 808.

Since functions and systematic correlations of the input unit 802, the estimation unit 804, the determination unit 806, and the control unit 808 of the installation angle distinction apparatus 800 according to the third embodiment of the present disclosure are the same as the functions and systematic correlations of the input unit (102 in FIG. 2), the estimation unit (104 in FIG. 2), the determination unit (106 in FIG. 2), and the control unit (108 in FIG. 2) of the installation angle distinction apparatus (100 in FIG. 2) according to the first embodiment, additional explanations of each of the elements will be omitted below.

Here, the installation angle distinction apparatus 800 according to the third embodiment of the present disclosure further includes a first driving unit 812.

That is, when the current vertical installation angle value ($\alpha$ in FIG. 4) estimated by the estimation unit 804 is determined by the determination unit 806 to be deviated from the reference vertical installation angle value range, the first driving unit 812 drives a velocity adjuster 20 in accordance with controlling by the control unit 808 such that the vehicle is driven by lowering the current velocity to be within a preset target velocity level range.

Here, although not illustrated, the input unit 802, the estimation unit 804, the determination unit 806, the control unit 808, and the first driving unit 812 may be provided to a general ECU (not shown) for controlling an overall operation of a vehicle by a main computer applied to the vehicle, inputting determined and detected information, estimating the current vertical installation angle value ($\alpha$ in FIG. 4), and driving the velocity adjuster 20.

In addition, although not illustrated, the input unit 802, the estimation unit 804, the determination unit 806, the control unit 808, and the first driving unit 812 may be provided to a general MCU (not shown) for controlling an overall operation of a vehicle by a processor, a memory, and an input/output device disposed in one chip, inputting determined and detected information, estimating the current vertical installation angle value ($\alpha$ in FIG. 4), and driving the velocity adjuster 20.

In addition, the input unit 802, the estimation unit 804, the determination unit 806, the control unit 808, and the first driving unit 812 are not limited thereto, and may be any controlling means, determining means, inputting means, estimating means, and driving means each capable of controlling an overall operation of a vehicle, inputting determined and detected information, estimating the current vertical installation angle value ($\alpha$ in FIG. 4), and driving the velocity adjuster 20.

Here, the input unit 802, the estimation unit 804, the determination unit 806, the control unit 808, and the first driving unit 812 may be provided to the ECU (not shown) or the MCU (not shown) in an integrated form or may be provided to the ECU (not shown) or the MCU (not shown) in a separate form.

An installation angle distinction method for distinguishing an installation angle using the installation angle distinction apparatus 800 according to the third embodiment of the present disclosure is described with reference to FIG. 9 below.

Figure 9:
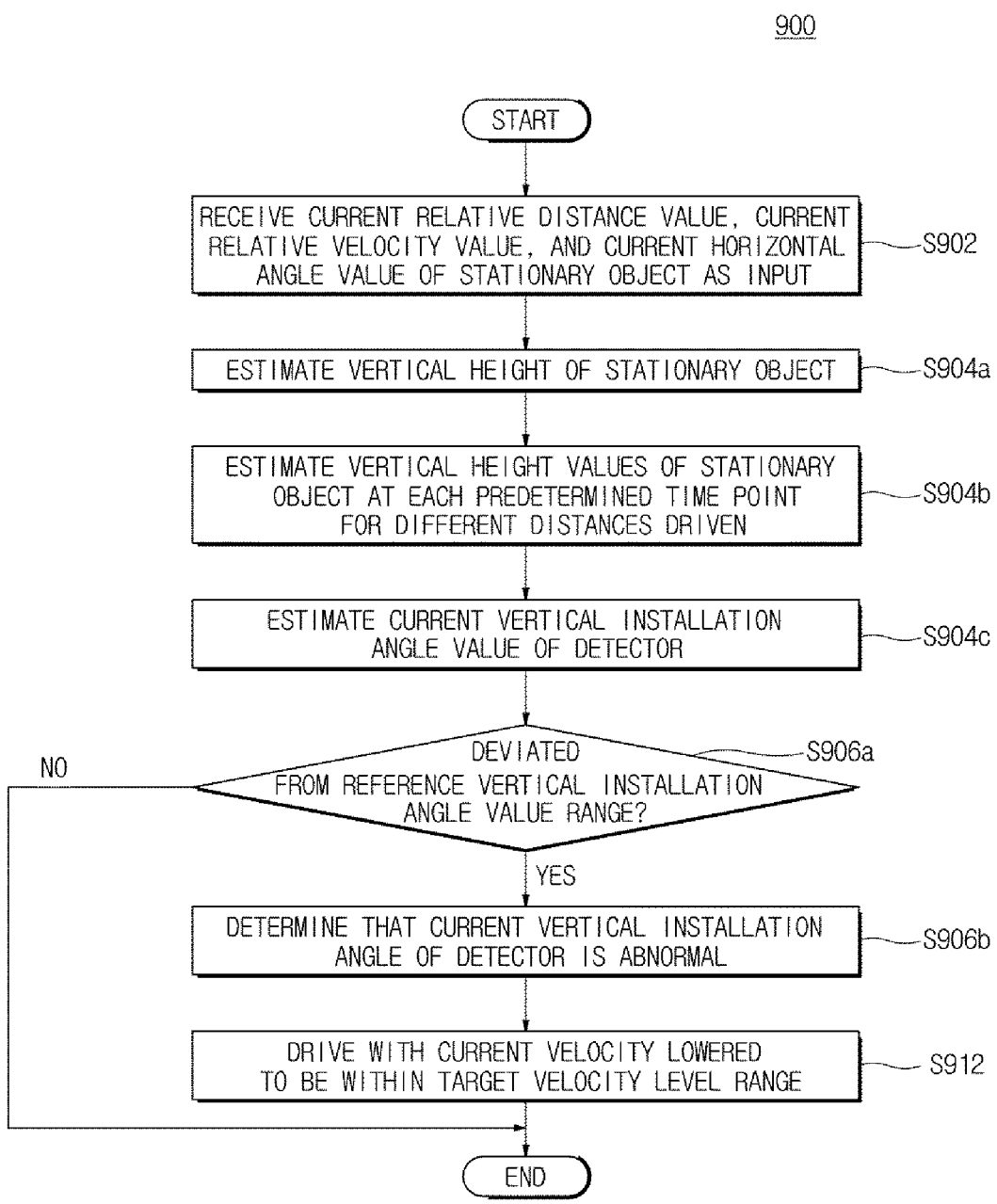
FIG. 9 is a flow chart illustrating an example of an installation angle distinction method using the installation angle distinction apparatus according to the third embodiment of the present disclosure.

FIG. 9 is a flow chart illustrating an example of an installation angle distinction method using the installation angle distinction apparatus according to the third embodiment of the present disclosure.

Referring to FIG. 9, same as the installation angle distinction method (500 in FIG. 5) using the installation angle distinction apparatus (100 in FIG. 2) according to the first embodiment, an installation angle distinction method 900 using the installation angle distinction apparatus (800 in FIG. 8) according to the third embodiment of the present disclosure includes an inputting step (S902), estimating steps (S904$a$, S904$b$, S904$c$), and determining steps (S906$a$, S906$b$).

Since functions and systematic correlations of the inputting step (S902), the estimating steps (S904$a$, S904$b$, S904$c$), and the determining steps (S906$a$, S906$b$) of the installation angle distinction method 900 using the installation angle distinction apparatus (800 in FIG. 8) according to the third embodiment of the present disclosure are the same as the functions and systematic correlations of the inputting step (S502 in FIG. 5), the estimating steps (S504$a$, S504$b$, S504$c$ in FIG. 5), and the determining steps (S506$a$, S506$b$ in FIG. 5) of the installation angle distinction method (500 in FIG. 5) using the installation angle distinction apparatus (100 in FIG. 2) according to the first embodiment, additional explanations of each of the steps will be omitted below.

Here, the installation angle distinction method 900 using the installation angle distinction apparatus (800 in FIG. 8) according to the third embodiment of the present disclosure further includes a first driving step (S912).

For example, the first driving step (S912) may be performed after the determining step (S906$b$).

That is, when the current vertical installation angle value ($\alpha$ in FIG. 4) estimated by the estimation unit (804 in FIG. 8) is determined by the determination unit (806 in FIG. 8) to be deviated from the reference vertical installation angle value range, the first driving step S912 drives the velocity adjuster (20 in FIG. 8) by the first driving unit (812 in FIG. 8) in accordance with the controlling by the control unit (808 in FIG. 8) such that the vehicle is driven with the current velocity lowered to be within the preset target velocity level range.

As above, the installation angle distinction apparatus 800 and the distinction method 900 thereof according to the third embodiment of the present disclosure include the input unit 802, the estimation unit 804, the determination unit 806, the control unit 808, and the first driving unit 812 to perform the inputting step (S902), the estimating steps (S904*a*, S904*b*, S904*c*), the determining steps (S906*a*, S906*b*), and the first driving step (S912).

Consequently, the installation angle distinction apparatus 800 and the distinction method 900 thereof according to the third embodiment of the present disclosure may estimate the current vertical installation angle value (α in FIG. 4) of the detector 10 to determine an installation angle, thereby efficiently determining the installation angle.

In addition, when the current vertical installation angle value (α in FIG. 4) deviates from the reference vertical installation angle value range, the installation angle distinction apparatus 800 and the distinction method 900 thereof according to the third embodiment of the present disclosure may allow the vehicle to be driven by lowering the current velocity to be within the target velocity level range.

Consequently, the installation angle distinction apparatus 800 and the distinction method 900 thereof according to the third embodiment of the present disclosure may prevent a traffic accident while improving efficiency in driving.

Figure 10:
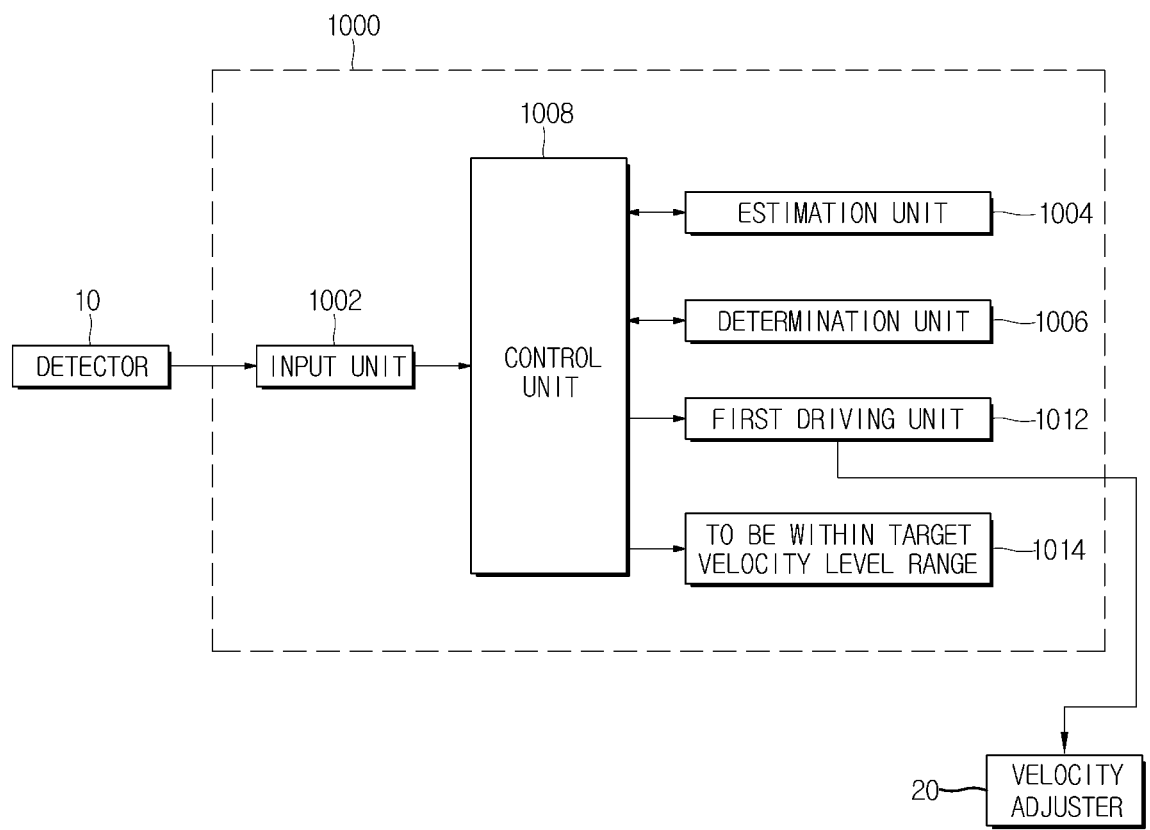
FIG. 10 is a block diagram illustrating an example of an installation angle distinction apparatus according to a fourth embodiment of the present disclosure.

FIG. 10 is a block diagram illustrating an example of an installation angle distinction apparatus according to a fourth embodiment of the present disclosure.

Referring to FIG. 10, same as the installation angle distinction apparatus (800 in FIG. 8) according to the third embodiment, an installation angle distinction apparatus 1000 according to the fourth embodiment of the present disclosure includes an input unit 1002, an estimation unit 1004, a determination unit 1006, a control unit 1008, and a first driving unit 1012.

Since functions and systematic correlations of the input unit 1002, the estimation unit 1004, the determination unit 1006, the control unit 1008, and the first driving unit 1012 of the installation angle distinction apparatus 1000 according to the fourth embodiment of the present disclosure are the same as the functions and systematic correlations of the input unit (802 in FIG. 8), the estimation unit (804 in FIG. 8), the determination unit (806 in FIG. 8), the control unit (808 in FIG. 8), and the first driving unit (812 in FIG. 8) of the installation angle distinction apparatus (800 in FIG. 8) according to the third embodiment, additional explanations of each of the elements will be omitted below.

Here, the installation angle distinction apparatus 1000 according to the fourth embodiment of the present disclosure further includes a second identification unit 1014.

That is, when the first driving unit 1012 drives the velocity adjuster 20, the second identification unit 1014 identifies that the vehicle is driven with the current velocity lowered to be within the target velocity level range in accordance with controlling by the control unit 1008.

Here, although not illustrated, the second identification unit 1014 may include at least one among an alarm (not shown), a speaker (not shown), and a light-emitting member (not shown) provided for a driver to identify information or state of a vehicle to identify that the vehicle is driven with the current velocity lowered to be within the target velocity level range by at least one operation among the alarming operation of the alarm (not shown), the voice operation of the speaker (not shown), and the light-emitting operation of the light-emitting member (not shown).

In addition, the installation angle distinction apparatus 600 and the distinction method 700 thereof according to the second embodiment of the present disclosure may allow a driver to abort or end the operation of the radar (not shown) included in the detector 10 when the current vertical installation angle of the detector 10 is abnormal.

In addition, although not illustrated, the second identification unit 1014 may include at least one of a human machine interface (HMI) module (not shown) and a head-up display (HUD) module (not shown) embedded to interface a user and a machine for a driver to recognize information or state of a vehicle to identify that the vehicle is driven with the current velocity lowered to be within the target velocity level range by at least one operation of an HMI message display operation of the HMI module (not shown) and an HUD message display operation of the HUD module (not shown).

An installation angle distinction method for distinguishing an installation angle using the installation angle distinction apparatus 1000 according to the fourth embodiment of the present disclosure may be described with reference to FIG. 11 below.

Figure 11:
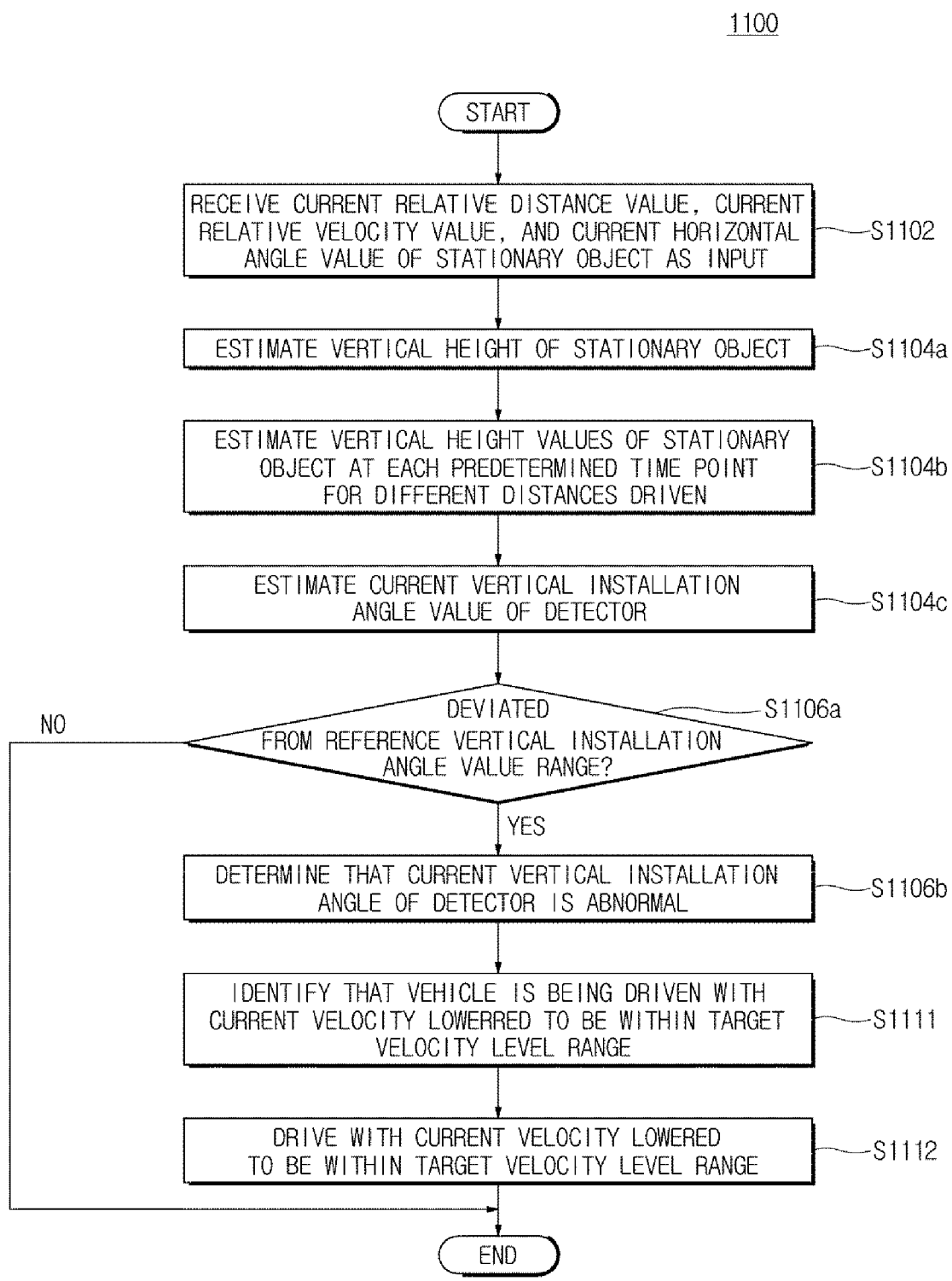
FIG. 11 is a flow chart illustrating an example of an installation angle distinction method using the installation angle distinction apparatus according to the fourth embodiment of the present disclosure.

FIG. 11 is a flow chart illustrating an example of an installation angle distinction method using the installation angle distinction apparatus according to the fourth embodiment of the present disclosure.

Referring to FIG. 11, same as the installation angle distinction method (900 in FIG. 9) using the installation angle distinction apparatus (800 in FIG. 8) according to the third embodiment, an installation angle distinction method 1100 using the installation angle distinction apparatus (1000 in FIG. 10) according to the fourth embodiment of the present disclosure includes an inputting step (S1102), estimating steps (S1104*a*, S1104*b*, S1104*c*), determining steps (S1106*a*, S1106*b*), and a first driving step (S1112).

Since functions and systematic correlations of the inputting step (S1102), the estimating steps (S1104*a*, S1104*b*, S1104*c*), the determining steps (S1106*a*, S1106*b*), and the first driving step (S1112) of the installation angle distinction method 1100 using the installation angle distinction apparatus (1000 in FIG. 10) according to the fourth embodiment of the present disclosure are the same as the functions and systematic correlations of the inputting step (S902 in FIG. 9), the estimating steps (S904*a*, S904*b*, S904*c* in FIG. 9), the determining steps (S906*a*, S906*b* in FIG. 9), and the first driving step (S912 in FIG. 9) of the installation angle distinction method (900 in FIG. 9) using the installation angle distinction apparatus (800 in FIG. 8) according to the third embodiment, additional explanations of each of the steps will be omitted below.

Here, the installation angle distinction method 1100 using the installation angle distinction apparatus (1000 in FIG. 10) according to the fourth embodiment of the present disclosure further includes a second identifying step (S1111).

For example, the second identifying step (S1111) may be performed after the determining step (S1106*b*).

In another example, although not illustrated, a second identifying step (not shown) may be performed by being synchronized with the determining step (S1106*b*).

That is, in the second identifying step (S1111), when the first driving unit (1012 in FIG. 10) drives the velocity adjuster (20 in FIG. 10), the second identification unit (1014 in FIG. 10) identifies that the vehicle is driven with the current velocity lowered to be within the target velocity level range in accordance with the controlling by the control unit (1008 in FIG. 10).

As above, the installation angle distinction apparatus 1000 and the distinction method 1100 thereof according to the fourth embodiment of the present disclosure include the input unit 1002, the estimation unit 1004, the determination unit 1006, the control unit 1008, the first driving unit 1012, and the second identification unit 1014 to perform the inputting step (S1102), the estimating steps (S1104*a*, S1104*b*, S1104*c*), the determining steps (S1106*a*, S1106*b*), the second identifying step (S1111), and the first driving step (S1112).

Consequently, the installation angle distinction apparatus 1000 and the distinction method 1100 thereof according to the fourth embodiment of the present disclosure may estimate the current vertical installation angle value (α in FIG. 4) of the detector 10 to determine an installation angle, thereby efficiently determining the installation angle.

In addition, when the current vertical installation angle value (α in FIG. 4) deviates from the reference vertical installation angle value range, the installation angle distinction apparatus 1000 and the distinction method 1100 thereof according to the fourth embodiment of the present disclosure may allow the vehicle to be driven with the current velocity lowered to be within the target velocity level range.

Consequently, the installation angle distinction apparatus 1000 and the distinction method 1100 thereof according to the fourth embodiment of the present disclosure may prevent a traffic accident while improving efficiency in driving.

Furthermore, since the installation angle distinction apparatus 1000 and the distinction method 1100 thereof according to the fourth embodiment of the present disclosure allow identifying that the vehicle is driven with the current velocity lowered to be within the target velocity level range, convenience in driving may be improved while inducing cautious driving of a driver.

Figure 12:
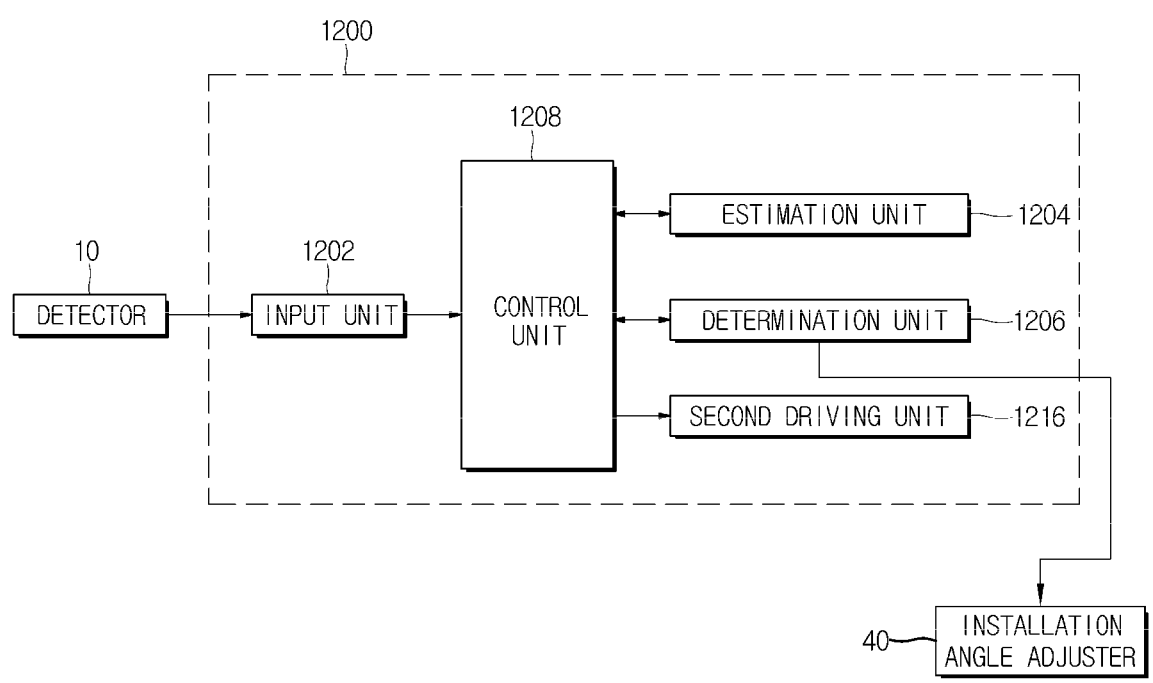
FIG. 12 is a block diagram illustrating an example of an installation angle distinction apparatus according to a fifth embodiment of the present disclosure.

FIG. 12 is a block diagram illustrating an example of an installation angle distinction apparatus according to a fifth embodiment of the present disclosure.

Referring to FIG. 12, same as the installation angle distinction apparatus (100 in FIG. 2) according to the first embodiment, an installation angle distinction apparatus 1200 according to the fifth embodiment of the present disclosure includes an input unit 1202, an estimation unit 1204, a determination unit 1206, and a control unit 1208.

Since functions and systematic correlations of the input unit 1202, the estimation unit 1204, the determination unit 1206, and the control unit 1208 of the installation angle distinction apparatus 1200 according to the fifth embodiment of the present disclosure are the same as the functions and systematic correlations of the input unit (102 in FIG. 2), the estimation unit (104 in FIG. 2), the determination unit (106 in FIG. 2), and the control unit (108 in FIG. 2) of the installation angle distinction apparatus (100 in FIG. 2) according to the first embodiment, additional explanations of each of the elements will be omitted below.

Here, the installation angle distinction apparatus 1200 according to the fifth embodiment of the present disclosure further includes a second driving unit 1216.

That is, when the current vertical installation angle value estimated by the estimation unit 1204 is determined by the determination unit 1206 to be deviated from the reference vertical installation angle value range, the second driving unit 1216 drives an installation angle adjuster 40 in accordance with controlling by the control unit 1208 such that the current vertical installation angle value is compensated to be within a preset target vertical installation angle value range.

Here, although not illustrated, the input unit 1202, the estimation unit 1204, the determination unit 1206, the control unit 1208, and the second driving unit 1216 may be provided to a general ECU (not shown) for controlling an overall operation of a vehicle by a main computer applied to the vehicle, inputting determined and detected information, estimating the current vertical installation angle value (α in FIG. 4), and driving the installation angle adjuster 40.

In addition, although not illustrated, the input unit 1202, the estimation unit 1204, the determination unit 1206, the control unit 1208, and the second driving unit 1216 may be provided to a general MCU (not shown) for controlling an overall operation of a vehicle by a processor, a memory, and an input/output device disposed in one chip, inputting determined and detected information, estimating the current vertical installation angle value (α in FIG. 4), and driving the installation angle adjuster 40.

In addition, the input unit 1202, the estimation unit 1204, the determination unit 1206, the control unit 1208, and the second driving unit 1216 are not limited thereto and may be any controlling means, determining means, inputting means, estimating means, and driving means each capable of controlling an overall operation of a vehicle, inputting determined and detected information, estimating the current vertical installation angle value (α in FIG. 4), and driving the installation angle adjuster 40.

Here, the input unit 1202, the estimation unit 1204, the determination unit 1206, the control unit 1208, and the second driving unit 1216 may be provided to the ECU (not shown) or the MCU (not shown) in an integrated form or may be provided to the ECU (not shown) or the MCU (not shown) in a separate form.

An installation angle distinction method for distinguishing an installation angle using the installation angle distinction apparatus 1200 according to the fifth embodiment of the present disclosure may be described with reference to FIG. 13 below.

Figure 13:
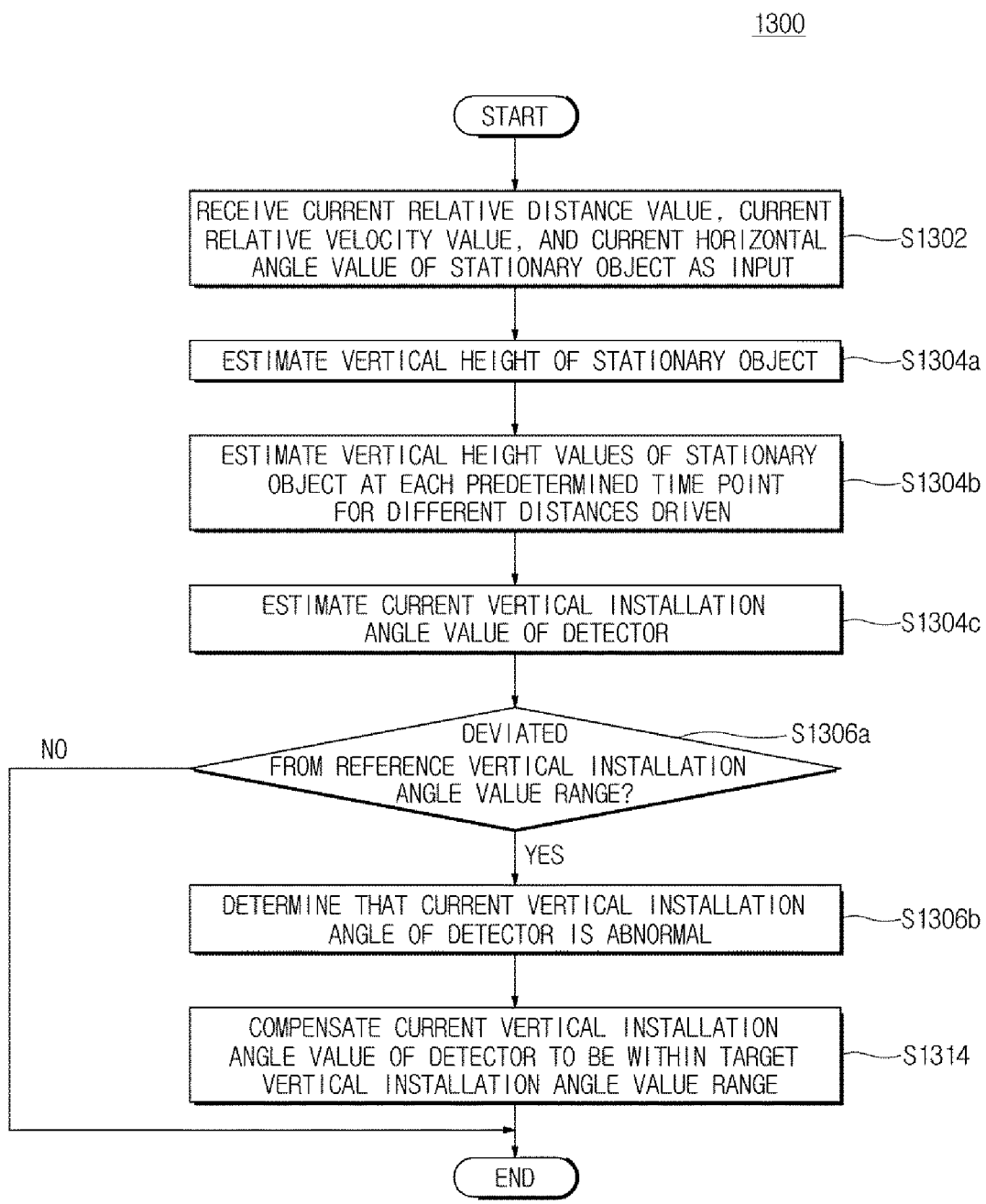
FIG. 13 is a flow chart illustrating an example of an installation angle distinction method using the installation angle distinction apparatus according to the fifth embodiment of the present disclosure.

FIG. 13 is a flow chart illustrating an example of an installation angle distinction method using the installation angle distinction apparatus according to the fifth embodiment of the present disclosure.

Referring to FIG. 13, same as the installation angle distinction method (500 in FIG. 5) using the installation angle distinction apparatus (100 in FIG. 2) according to the first embodiment, an installation angle distinction method 1300 using the installation angle distinction apparatus (1200 in FIG. 12) according to the fifth embodiment of the present disclosure includes an inputting step (S1302), estimating steps (S1304*a*, S1304*b*, S1304*c*), and determining steps (S1306*a*, S1306*b*).

Since functions and systematic correlations of the inputting step (S1302), the estimating steps (S1304*a*, S1304*b*, S1304*c*), and the determining steps (S1306*a*, S1306*b*) of the installation angle distinction method 1300 using the installation angle distinction apparatus (1200 in FIG. 12) according to the fifth embodiment of the present disclosure are the same as the functions and systematic correlations of the inputting step (S502 in FIG. 5), the estimating steps (S504*a*, S504*b*, S504*c* in FIG. 5), and the determining steps (S506*a*, S506*b* in FIG. 5) of the installation angle distinction method (500 in FIG. 5) using the installation angle distinction apparatus (100 in FIG. 2) according to the first embodiment, additional explanations of each of the steps will be omitted below.

Here, the installation angle distinction method 1300 using the installation angle distinction apparatus (1200 in FIG. 12) according to the fifth embodiment of the present disclosure further includes a second driving step (S1314).

For example, the second driving step (S1314) may be performed after the determining step (S1306*b*).

That is, when the current vertical installation angle value (α in FIG. 4) estimated by the estimation unit (1204 in FIG. 12) is determined by the determination unit (1206 in FIG.

12) to be deviated from the reference vertical installation angle value range, the second driving step S1314 drives the installation angle adjuster (40 in FIG. 12) by the second driving unit (1216 in FIG. 12) in accordance with the controlling by the control unit (1208 in FIG. 12) such that the current vertical installation angle value ($\alpha$ in FIG. 4) of the detector (10 in FIG. 12) is compensated to be within the preset target vertical installation angle value range.

As above, the installation angle distinction apparatus 1200 and the distinction method 1300 thereof according to the fifth embodiment of the present disclosure include the input unit 1202, the estimation unit 1204, the determination unit 1206, the control unit 1208, and the second driving unit 1216 to perform the inputting step (S1302), the estimating steps (S1304a, S1304b, S1304c), the determining steps (S1306a, S1306b), and the second driving step (S1314).

Consequently, the installation angle distinction apparatus 1200 and the distinction method 1300 thereof according to the fifth embodiment of the present disclosure may estimate the current vertical installation angle value ($\alpha$ in FIG. 4) of the detector 10 to determine an installation angle, thereby efficiently determining the installation angle.

In addition, when the current vertical installation angle value ($\alpha$ in FIG. 4) deviates from the reference vertical installation angle value range, the installation angle distinction apparatus 1200 and the distinction method 1300 thereof according to the fifth embodiment of the present disclosure may allow the current vertical installation angle value ($\alpha$ in FIG. 4) of the detector 10 to be compensated to be within the target vertical installation angle value range.

Consequently, the installation angle distinction apparatus 1200 and the distinction method 1300 thereof according to the fifth embodiment of the present disclosure may provide accurately detected information of the detector 10 to a driver, thereby preventing a traffic accident while improving reliability of the detector 10.

Figure 14:
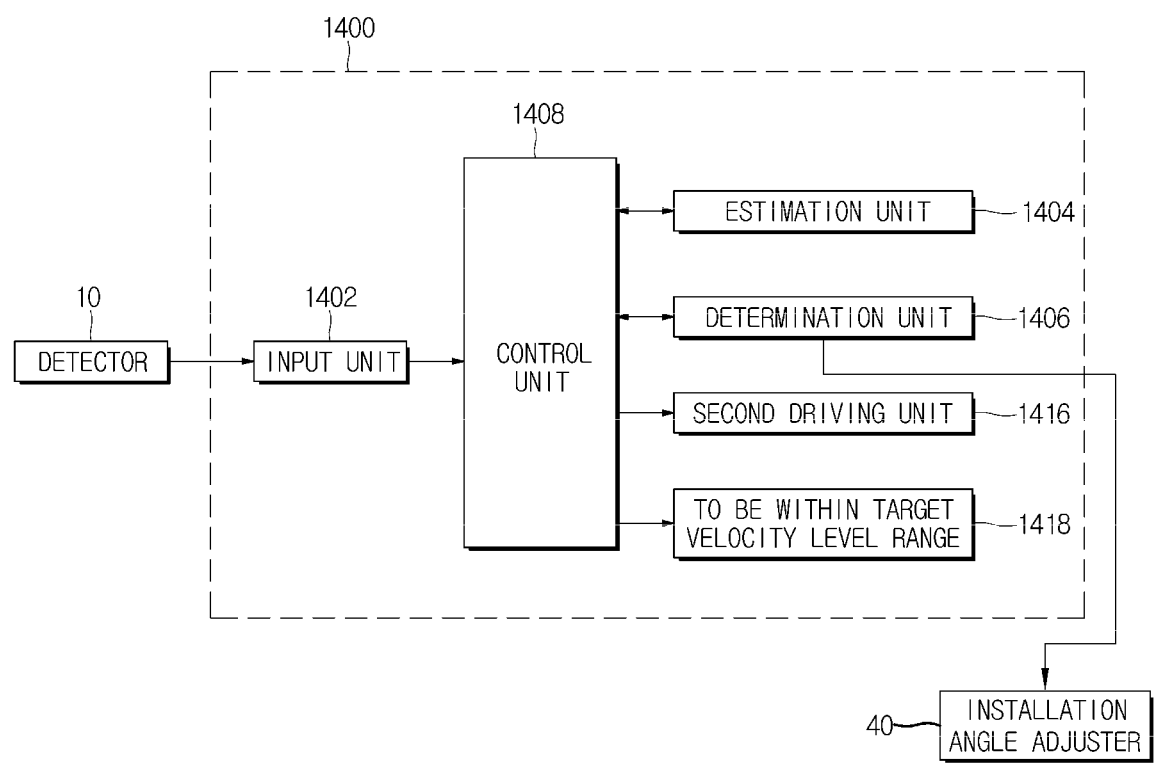
FIG. 14 is a block diagram illustrating an example of an installation angle distinction apparatus according to a sixth embodiment of the present disclosure.

FIG. 14 is a block diagram illustrating an example of an installation angle distinction apparatus according to a sixth embodiment of the present disclosure.

Referring to FIG. 14, same as the installation angle distinction apparatus (1200 in FIG. 12) according to the fifth embodiment, an installation angle distinction apparatus 1400 according to the sixth embodiment of the present disclosure includes an input unit 1402, an estimation unit 1404, a determination unit 1406, a control unit 1408, and a second driving unit 1416.

Since functions and systematic correlations of the input unit 1402, the estimation unit 1404, the determination unit 1406, the control unit 1408, and the second driving unit 1416 of the installation angle distinction apparatus 1400 according to the sixth embodiment of the present disclosure are the same as the functions and systematic correlations of the input unit (1202 in FIG. 12), the estimation unit (1204 in FIG. 12), the determination unit (1206 in FIG. 12), the control unit (1208 in FIG. 12), and the second driving unit (1216 in FIG. 12) of the installation angle distinction apparatus (1200 in FIG. 12) according to the fifth embodiment, additional explanations of each of the elements will be omitted below.

Here, the installation angle distinction apparatus 1400 according to the sixth embodiment of the present disclosure further includes a third identification unit 1418.

That is, when the second driving unit 1416 drives the installation angle adjuster 40, the third identification unit 1418 identifies that the current vertical installation angle value ($\alpha$ in FIG. 4) of the detector 10 is compensated to be within the target vertical installation angle value range in accordance with controlling by the control unit 1408.

Here, although not illustrated, the third identification unit 1418 may include at least one among an alarm (not shown), a speaker (not shown), and a light-emitting member (not shown) provided for a driver to identify information or state of a vehicle to identify that the current vertical installation angle value ($\alpha$ in FIG. 4) of the detector 10 is compensated to be within the target vertical installation angle value range by at least one operation among the alarming operation of the alarm (not shown), the voice operation of the speaker (not shown), and the light-emitting operation of the light-emitting member (not shown).

In addition, although not illustrated, the third identification unit 1418 may include at least one of an HMI module (not shown) and an HUD module (not shown) embedded to interface a user and a machine for a driver to recognize information or state of a vehicle to identify that the current vertical installation angle value ($\alpha$ in FIG. 4) of the detector 10 is compensated to be within the target vertical installation angle value range by at least one operation of an HMI message display operation of the HMI module (not shown) and an HUD message display operation of the HUD module (not shown).

An installation angle distinction method for distinguishing an installation angle using the installation angle distinction apparatus 1400 according to the sixth embodiment of the present disclosure may be described with reference to FIG. 15 below.

Figure 15:
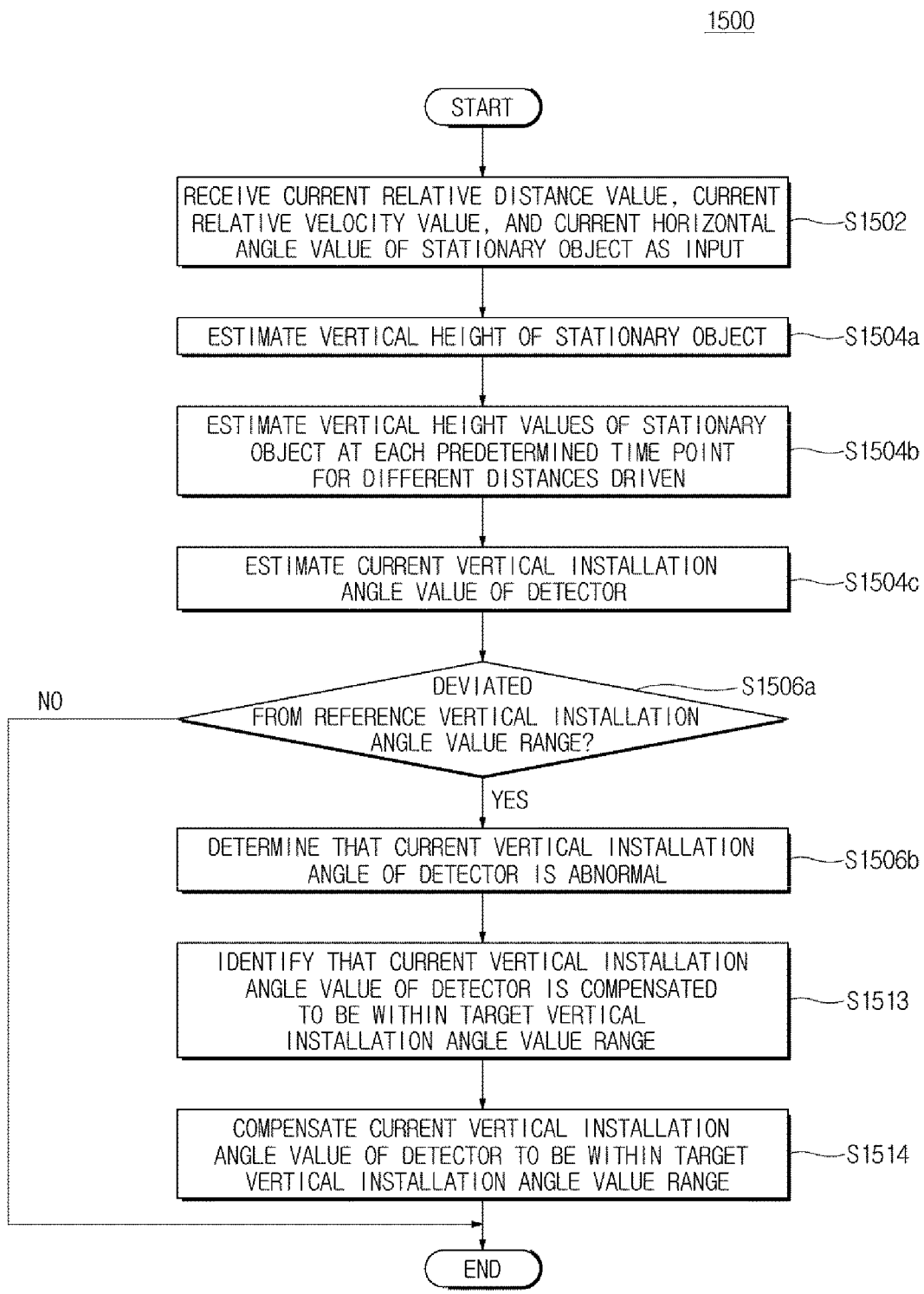
FIG. 15 is a flow chart illustrating an example of an installation angle distinction method using the installation angle distinction apparatus according to the sixth embodiment of the present disclosure.

FIG. 15 is a flow chart illustrating an example of an installation angle distinction method using the installation angle distinction apparatus according to the sixth embodiment of the present disclosure.

Referring to FIG. 15, same as the installation angle distinction method (1300 in FIG. 13) using the installation angle distinction apparatus (1200 in FIG. 12) according to the fifth embodiment, an installation angle distinction method 1500 using the installation angle distinction apparatus (1400 in FIG. 14) according to the sixth embodiment of the present disclosure includes an inputting step (S1502), estimating steps (S1504a, S1504b, S1504c), determining steps (S1506a, S1506b), and a second driving step (S1514).

Since functions and systematic correlations of the inputting step (S1502), the estimating steps (S1504a, S1504b, S1504c), the determining steps (S1506a, S1506b), and the second driving step (S1514) of the installation angle distinction method 1500 using the installation angle distinction apparatus (1400 in FIG. 14) according to the sixth embodiment of the present disclosure are the same as the functions and systematic correlations of the inputting step (S1302 in FIG. 13), the estimating steps (S1304a, S1304b, S1304c in FIG. 13), the determining steps (S1306a, S1306b in FIG. 13), and the second driving step (S1314 in FIG. 13) of the installation angle distinction method (1300 in FIG. 13) using the installation angle distinction apparatus (1200 in FIG. 12) according to the fifth embodiment, additional explanations of each of the steps will be omitted below.

Here, the installation angle distinction method 1500 using the installation angle distinction apparatus (1400 in FIG. 14) according to the sixth embodiment of the present disclosure further includes a third identifying step (S1513).

For example, the third identifying step (S1513) may be performed after the determining step (S1506b).

In another example, although not illustrated, a third identifying step (not shown) may be performed by being synchronized with the determining step (S1506b).

That is, in the third identifying step (S1513), when the second driving unit (1416 in FIG. 14) drives the installation angle adjuster (40 in FIG. 14), the third identification unit (1418 in FIG. 14) identifies that the current vertical installation angle value (α in FIG. 4) of the detector (10 in FIG. 14) is compensated to be within the target vertical installation angle value range in accordance with the controlling by the control unit (1408 in FIG. 14).

As above, the installation angle distinction apparatus 1400 and the distinction method 1500 thereof according to the sixth embodiment of the present disclosure include the input unit 1402, the estimation unit 1404, the determination unit 1406, the control unit 1408, the second driving unit 1416, and the third identification unit 1418 to perform the inputting step (S1502), the estimating steps (S1504a, S1504b, S1504c), the determining steps (S1506a, S1506b), the third identifying step (S1513), and the second driving step (S1514).

Consequently, the installation angle distinction apparatus 1400 and the distinction method 1500 thereof according to the sixth embodiment of the present disclosure may estimate the current vertical installation angle value (α in FIG. 4) of the detector 10 to determine an installation angle, thereby efficiently determining the installation angle.

In addition, when the current vertical installation angle value (α in FIG. 4) deviates from the reference vertical installation angle value range, the installation angle distinction apparatus 1400 and the distinction method 1500 thereof according to the sixth embodiment of the present disclosure may allow the current vertical installation angle value (α in FIG. 4) of the detector 10 to be compensated to be within the target vertical installation angle value range.

Consequently, the installation angle distinction apparatus 1400 and the distinction method 1500 thereof according to the sixth embodiment of the present disclosure may provide accurately detected information of the detector 10 to a driver, thereby preventing a traffic accident while improving reliability of the detector 10.

Furthermore, since the installation angle distinction apparatus 1400 and the distinction method 1500 thereof according to the sixth embodiment of the present disclosure may identify that the current vertical installation angle value (α in FIG. 4) of the detector 10 is compensated to be within the target vertical installation angle value range, anxiety about a current position of the detector 10 may be suppressed while inducing cautious driving of a driver.

Figure 16:
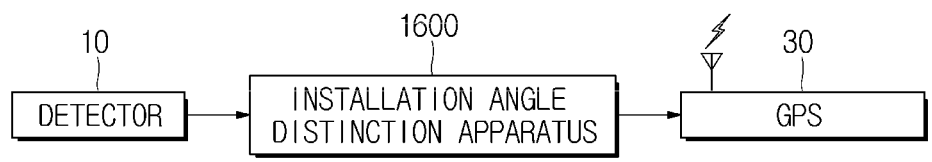
FIG. 16 is a block diagram illustrating a state in which an installation angle distinction apparatus according to a seventh embodiment of the present disclosure is connected to a detector and communicates with a Global Positioning System (GPS).
Figure 17:
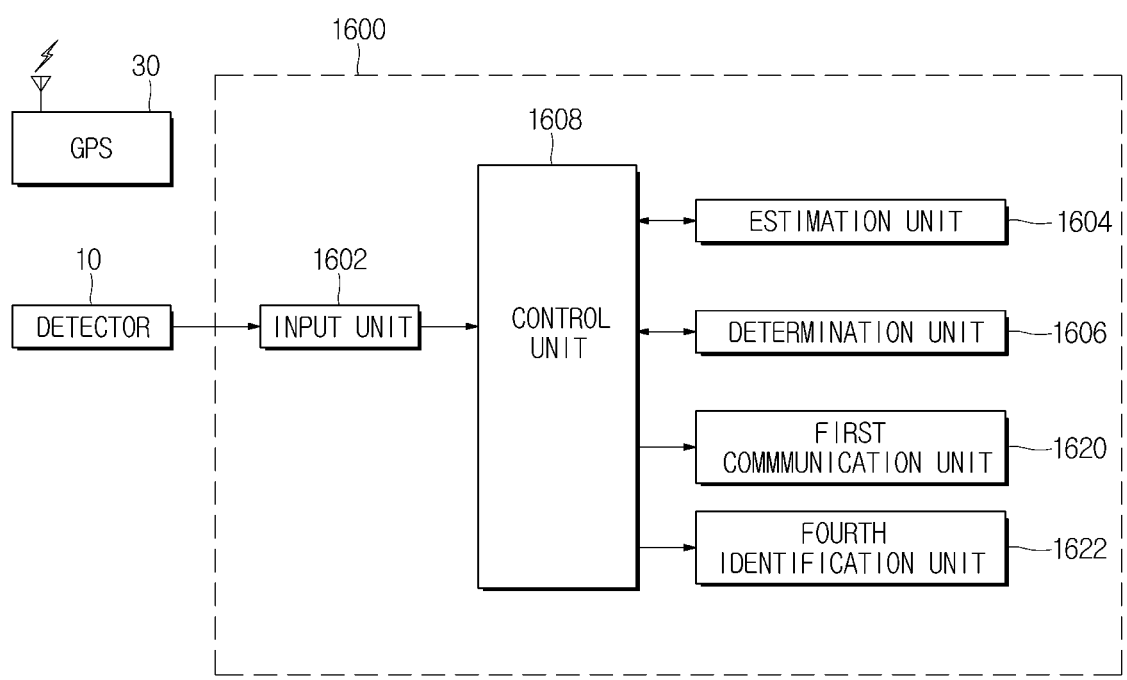
FIG. 17 is a block diagram illustrating an example of the installation angle distinction apparatus illustrated in FIG. 16

FIG. 16 is a block diagram illustrating a state in which an installation angle distinction apparatus according to a seventh embodiment of the present disclosure is connected to a detector and communicates with a Global Positioning System (GPS), and FIG. 17 is a block diagram illustrating an example of the installation angle distinction apparatus illustrated in FIG. 16.

Referring to FIGS. 16 and 17, same as the installation angle distinction apparatus (100 in FIG. 2) according to the first embodiment, an installation angle distinction apparatus 1600 according to the seventh embodiment of the present disclosure includes an input unit 1602, an estimation unit 1604, a determination unit 1606, and a control unit 1608.

Since functions and systematic correlations of the input unit 1602, the estimation unit 1604, the determination unit 1606, and the control unit 1608 of the installation angle distinction apparatus 1600 according to the seventh embodiment of the present disclosure are the same as the functions and systematic correlations of the input unit (102 in FIG. 2), the estimation unit (104 in FIG. 2), the determination unit (106 in FIG. 2), and the control unit (108 in FIG. 2) of the installation angle distinction apparatus (100 in FIG. 2) according to the first embodiment, additional explanations of each of the elements will be omitted below.

Here, the installation angle distinction apparatus 1600 according to the seventh embodiment of the present disclosure further includes a first communication unit 1620 and a fourth identification unit 1622.

That is, the first communication unit 1620 communicates with a GPS 30 in accordance with controlling by the control unit 1608 and, when the current vertical installation angle value (α in FIG. 4) estimated by the estimation unit 1604 is determined by the determination unit 1606 to be deviated from the reference vertical installation angle value range, transmits a communication signal to the GPS 30 in accordance with the controlling by the control unit 1608 for information on locations of nearby vehicle maintenance and repair centers to be searched by the GPS 30.

Here, although not illustrated, the first communication unit 1620 may include at least one of a Bluetooth module (not shown), a Wireless-Fidelity (Wi-Fi) module (not shown), a Zigbee module (not shown), a Wireless Broadband (WiBro) module (not shown), a Worldwide Interoperability for Microwave Access (Wi-Max) module (not shown), a long-term evolution (LTE) module (not shown), an LTE Advanced module (not shown), a Light-Fidelity (Li-Fi) module (not shown), and a Beacon module (not shown) to perform communication with the GPS 30.

In addition, the fourth identification unit 1622 identifies the information on the locations of the nearby vehicle maintenance and repair centers searched by the GPS 30 in accordance with the controlling by the control unit 1608.

Here, although not illustrated, the fourth identification unit 1622 may include at least one of an HMI module (not shown) and an HUD module (not shown) embedded to interface a user and a machine for a driver to recognize information or state of a vehicle to identify the searched information on the locations of the nearby vehicle maintenance and repair centers by at least one operation of the HMI message display operation of the HMI module (not shown) and the HUD message display operation of the HUD module (not shown).

An installation angle distinction method for distinguishing an installation angle using the installation angle distinction apparatus 1600 according to the seventh embodiment of the present disclosure may be described with reference to FIG. 18 below.

Figure 18:
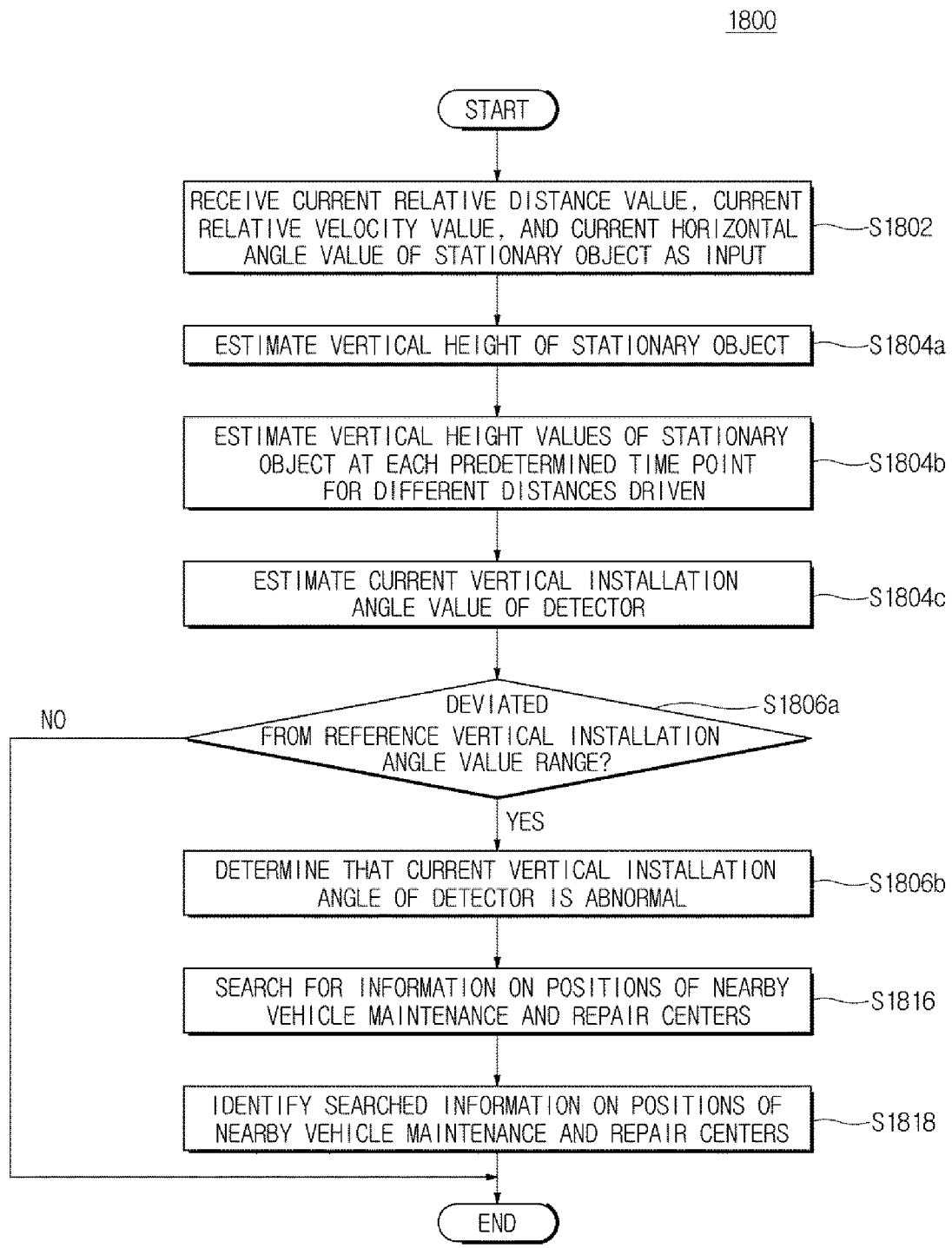
FIG. 18 is a flow chart illustrating an example of an installation angle distinction method using the installation angle distinction apparatus according to the seventh embodiment of the present disclosure.

FIG. 18 is a flow chart illustrating an example of an installation angle distinction method using the installation angle distinction apparatus according to the seventh embodiment of the present disclosure.

Referring to FIG. 18, same as the installation angle distinction method (500 in FIG. 5) using the installation angle distinction apparatus (100 in FIG. 2) according to the first embodiment, an installation angle distinction method 1800 using the installation angle distinction apparatus (1600 in FIG. 17) according to the seventh embodiment of the present disclosure includes an inputting step (S1802), estimating steps (S1804a, S1804b, S1804c), and determining steps (S1806a, S1806b).

Since functions and systematic correlations of the inputting step (S1802), the estimating steps (S1804a, S1804b, S1804c), and the determining steps (S1806a, S1806b) of the installation angle distinction method 1800 using the installation angle distinction apparatus (1600 in FIG. 17) according to the seventh embodiment of the present disclosure are the same as the functions and systematic correlations of the inputting step (S502 in FIG. 5), the estimating steps (S504a, S504b, S504c in FIG. 5), and the determining steps (S506a, S506b in FIG. 5) of the installation angle distinction method (500 in FIG. 5) using the installation angle distinction apparatus (100 in FIG. 2) according to the first embodiment, additional explanations of each of the steps will be omitted below.

Here, the installation angle distinction method 1800 using the installation angle distinction apparatus (1600 in FIG. 17) according to the seventh embodiment of the present disclosure further includes a first communicating step (S1816) and a fourth identifying step (S1818).

That is, the first communicating step (S1816) communicates with the GPS (30 in FIG. 17) in accordance with the controlling by the control unit (1608 in FIG. 17) provided to a vehicle and, when the current vertical installation angle value (α in FIG. 4) estimated by the estimation unit (1604 in FIG. 17) is determined by the determination unit (1606 in FIG. 17) to be deviated from the reference vertical installation angle value range, transmits a communication signal to the GPS (30 in FIG. 17) by the first communication unit (1620 in FIG. 17) in accordance with the controlling of the control unit (1608 in FIG. 17) for the information on the locations of the nearby vehicle maintenance and repair centers to be searched by the GPS 30.

Then, in the fourth identifying step (S1818), the fourth identification unit (1622 in FIG. 17) identifies the information on the locations of the nearby vehicle maintenance and repair centers searched by the GPS (30 in FIG. 17) in accordance with the controlling by the control unit (1608 in FIG. 17).

As above, the installation angle distinction apparatus 1600 and the distinction method 1800 thereof according to the seventh embodiment of the present disclosure include the input unit 1602, the estimation unit 1604, the determination unit 1606, the control unit 1608, the first communication unit 1620, and the fourth identification unit 1622 to perform the inputting step (S1802), the estimating steps (S1804a, S1804b, S1804c), the determining steps (S1806a, S1806b), the first communicating step (S1816), and the fourth identifying step (S1818).

Consequently, the installation angle distinction apparatus 1600 and the distinction method 1800 thereof according to the seventh embodiment of the present disclosure may estimate the current vertical installation angle value (α in FIG. 4) of the detector 10 to determine an installation angle, thereby efficiently determining the installation angle.

In addition, when the current vertical installation angle value (α in FIG. 4) deviates from the reference vertical installation angle value range, the installation angle distinction apparatus 1600 and the distinction method 1800 thereof according to the seventh embodiment of the present disclosure may search information on the locations of nearby vehicle maintenance and repair centers and identify the searched information on the locations of the nearby vehicle maintenance and repair centers.

Consequently, the installation angle distinction apparatus 1600 and the distinction method 1800 thereof according to the seventh embodiment of the present disclosure may allow a driver to easily locate a vehicle maintenance and repair center.

Accordingly, the installation angle distinction apparatus 1600 and the distinction method 1800 thereof according to the seventh embodiment of the present disclosure may shorten maintenance and repair time for maintaining and repairing a vehicle, thereby further preventing a traffic accident while suppressing an increase in the maintenance and repair cost.

Figure 19:
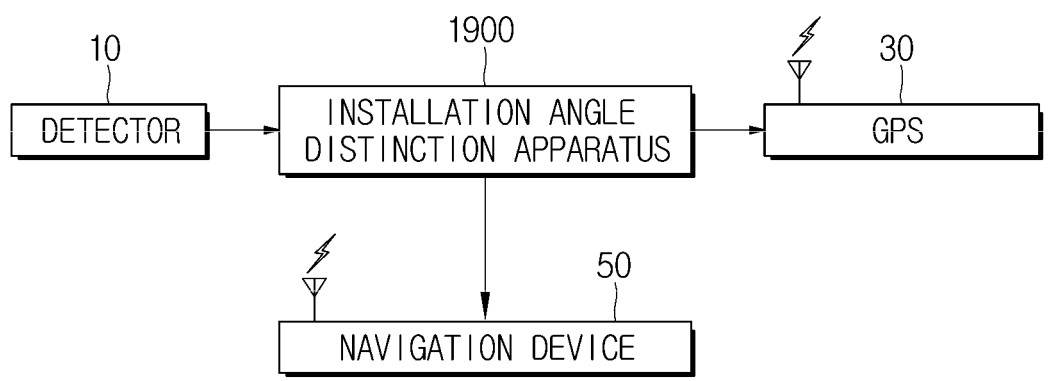
FIG. 19 is a block diagram illustrating a state in which an installation angle distinction apparatus according to an eighth embodiment of the present disclosure is connected to a detector and communicates with a GPS and a navigation device.
Figure 20:
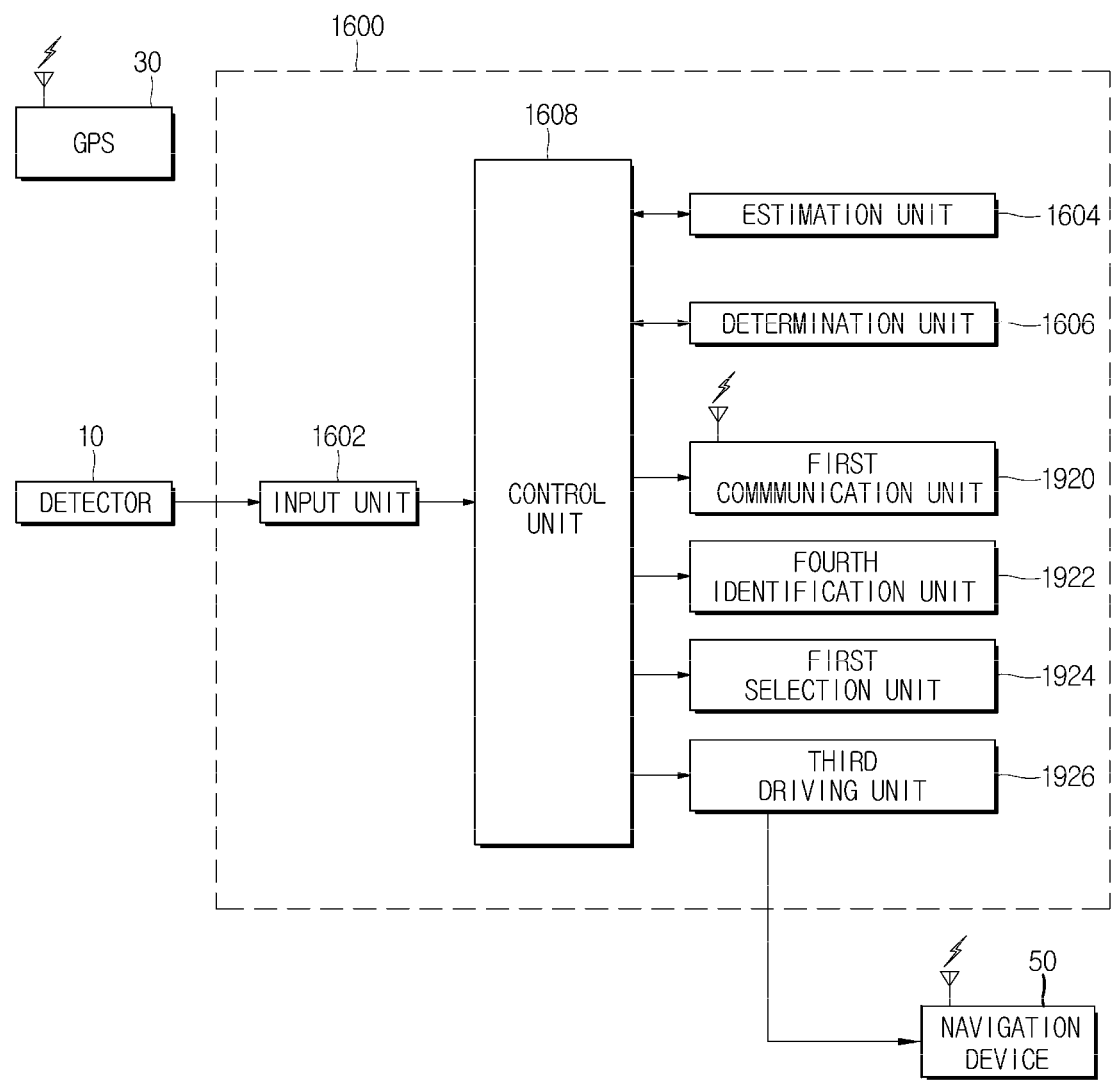
FIG. 20 is a block diagram illustrating an example of the installation angle distinction apparatus illustrated in FIG. 19.

FIG. 19 is a block diagram illustrating a state in which an installation angle distinction apparatus according to an eighth embodiment of the present disclosure is connected to a detector and communicates with a GPS and a navigation device, and FIG. 20 is a block diagram illustrating an example of the installation angle distinction apparatus illustrated in FIG. 19.

Referring to FIGS. 19 and 20, same as the installation angle distinction apparatus (1600 in FIG. 17) according to the seventh embodiment, an installation angle distinction apparatus 1900 according to the eighth embodiment of the present disclosure includes an input unit 1902, an estimation unit 1904, a determination unit 1906, a control unit 1908, a first communication unit 1920, and a fourth identification unit 1922.

Since functions and systematic correlations of the input unit 1902, the estimation unit 1904, the determination unit 1906, the control unit 1908, the first communication unit 1920, and the fourth identification unit 1922 of the installation angle distinction apparatus 1900 according to the eighth embodiment of the present disclosure are the same as the functions and systematic correlations of the input unit (1602 in FIG. 17), the estimation unit (1604 in FIG. 17), the determination unit (1606 in FIG. 17), the control unit (1608 in FIG. 17), the first communication unit (1620 in FIG. 17), and the fourth identification unit (1622 in FIG. 17) of the installation angle distinction apparatus (1600 in FIG. 17) according to the seventh embodiment, additional explanations of each of the elements will be omitted below.

Here, the installation angle distinction apparatus 1900 according to the eighth embodiment of the present disclosure further includes a first selection unit 1924 and a third driving unit 1926.

That is, the first selection unit 1924 selects a desired piece of information on a location of a vehicle maintenance and repair center from the information on the locations of the nearby vehicle maintenance and repair centers identified by the fourth identification unit 1922.

For example, in the first selection unit 1924, a desired piece of information on a location of a vehicle maintenance and repair center from the information on locations of nearby vehicle maintenance and repair centers displayed by at least one of the HMI module (not shown) and the HUD module (not shown) may be selected by a driver's finger touching motion.

In addition, the third driving unit 1926 transmits a navigation driving signal to a navigation device 50 in accordance with controlling by the control unit 1908 for the navigation device 50 to guide a vehicle to arrive at a vehicle maintenance and repair center corresponding to the piece of information on a location of a vehicle maintenance and repair center selected from the first selection unit 1924.

Here, although not illustrated, the input unit 1902, the estimation unit 1904, the determination unit 1906, the control unit 1908, and the third driving unit 1926 may be provided to a general ECU (not shown) for controlling an overall operation of a vehicle by a main computer applied to the vehicle, inputting determined and detected information, estimating the current vertical installation angle value (α in FIG. 4), and driving the navigation device 50.

In addition, although not illustrated, the input unit 1902, the estimation unit 1904, the determination unit 1906, the control unit 1908, and the third driving unit 1926 may be provided to a general MCU (not shown) for controlling an overall operation of a vehicle by a processor, a memory, and an input/output device disposed in one chip, inputting determined and detected information, estimating the current vertical installation angle value (α in FIG. 4), and driving the navigation device 50.

In addition, the input unit 1902, the estimation unit 1904, the determination unit 1906, the control unit 1908, and the third driving unit 1926 are not limited thereto, and may be any controlling means, determining means, inputting means, estimating means, and driving means each capable of controlling an overall operation of a vehicle, inputting determined and detected information, estimating the current vertical installation angle value (α in FIG. 4), and driving the navigation device 50.

Here, the input unit 1902, the estimation unit 1904, the determination unit 1906, the control unit 1908, and the third driving unit 1926 may be provided to the ECU (not shown) or the MCU (not shown) in an integrated form or may be provided to the ECU (not shown) or the MCU (not shown) in a separate form.

An installation angle distinction method for distinguishing an installation angle using the installation angle distinction apparatus 1900 according to the eighth embodiment of the present disclosure may be described with reference to FIG. 21 below.

Figure 21:
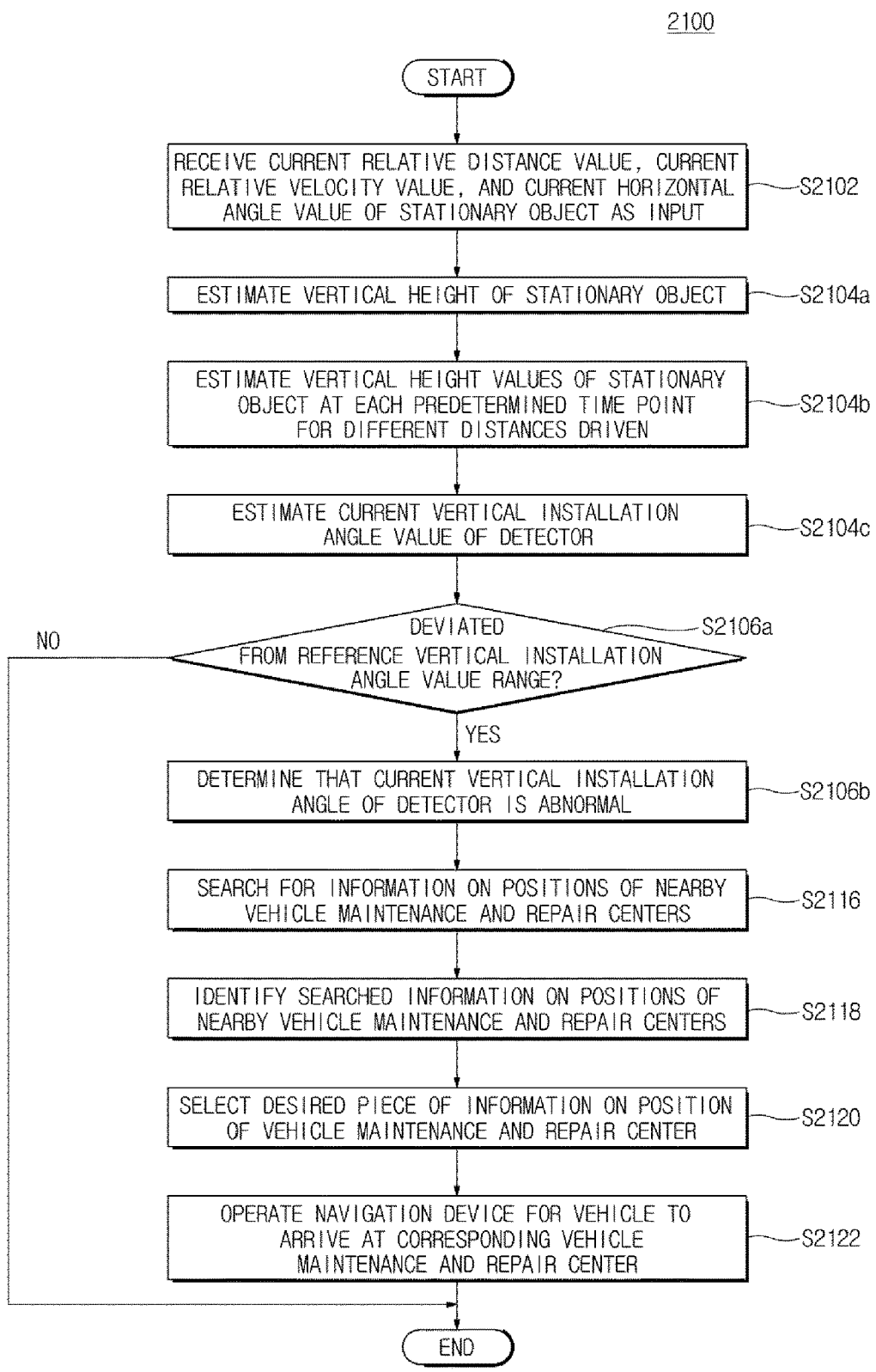
FIG. 21 is a flow chart illustrating an example of an installation angle distinction method using the installation angle distinction apparatus according to the eighth embodiment of the present disclosure.

FIG. 21 is a flow chart illustrating an example of an installation angle distinction method using the installation angle distinction apparatus according to the eighth embodiment of the present disclosure.

Referring to FIG. 21, same as the installation angle distinction method (1800 in FIG. 18) using the installation angle distinction apparatus (1600 in FIG. 17) according to the seventh embodiment, an installation angle distinction method 2100 using the installation angle distinction apparatus (1900 in FIG. 20) according to the eighth embodiment of the present disclosure includes an inputting step (S2102), estimating steps (S2104a, S2104b, S2104c), determining steps (S2106a, S2106b), a first communicating step (S2116), and a fourth identifying step (S2118).

Since functions and systematic correlations of the inputting step (S2102), the estimating steps (S2104a, S2104b, S2104c), the determining steps (S2106a, S2106b), the first communicating step (S2116), and the fourth identifying step (S2118) of the installation angle distinction method 2100 using the installation angle distinction apparatus (1900 in FIG. 20) according to the eighth embodiment of the present disclosure are the same as the functions and systematic correlations of the inputting step (S1802 in FIG. 18), the estimating steps (S1804a, S1804b, S1804c in FIG. 18), the determining steps (S1806a, S1806b in FIG. 18), the first communicating step (S1816 in FIG. 18), and the fourth identifying step (S1818 in FIG. 18) of the installation angle distinction method (1800 in FIG. 18) using the installation angle distinction apparatus (1600 in FIG. 17) according to the seventh embodiment, additional explanations of each of the steps will be omitted below.

Here, the installation angle distinction method 2100 using the installation angle distinction apparatus (1900 in FIG. 20) according to the eighth embodiment of the present disclosure further includes a first selecting step (S2120) and a third driving step (S2122).

That is, in the first selecting step (S2120), the first selection unit (1924 in FIG. 20) selects a desired piece of information on a location of a vehicle maintenance and repair center from the information on locations of nearby vehicle maintenance and repair centers identified from the fourth identification unit (1922 in FIG. 20).

In addition, the third driving step (S2122) transmits a navigation driving signal to a navigation device (50 in FIG. 20) by the third driving unit (1926 in FIG. 20) in accordance with the controlling by the control unit (1908 in FIG. 20) for the navigation device 50 to guide a vehicle to arrive at a vehicle maintenance and repair center corresponding to the piece of information on the location of a vehicle maintenance and repair center selected by the first selection unit (1924 in FIG. 20).

As above, the installation angle distinction apparatus 1900 and the distinction method 2100 thereof according to the eighth embodiment of the present disclosure include the input unit 1902, the estimation unit 1904, the determination unit 1906, the control unit 1908, the first communication unit 1920, the fourth identification unit 1922, the first selection unit 1924, and the third driving unit 1926 to perform the inputting step (S2102), the estimating steps (S2104a, S2104b, S2104c), the determining steps (S2106a, S2106b), the first communicating step (S2116), the fourth identifying step (S2118), the first selecting step (S2120), and the third driving step (S2122).

Consequently, the installation angle distinction apparatus 1900 and the distinction method 2100 thereof according to the eighth embodiment of the present disclosure may estimate the current vertical installation angle value (α in FIG. 4) of the detector 10 to determine an installation angle, thereby efficiently determining the installation angle.

In addition, when the current vertical installation angle value (α in FIG. 4) deviates from the reference vertical installation angle value range, the installation angle distinction apparatus 1900 and the distinction method 2100 thereof according to the eighth embodiment of the present disclosure may search information on locations of nearby vehicle maintenance and repair centers, identify the searched information on the locations of the nearby vehicle maintenance and repair centers, select a desired piece of information on a location of a nearby vehicle maintenance and repair center from the identified information on the locations of the nearby vehicle maintenance and repair centers, and allow a vehicle to arrive at a vehicle maintenance and repair center corresponding to the selected piece of information on the location of the vehicle maintenance and repair center.

Consequently, the installation angle distinction apparatus 1900 and the distinction method 2100 thereof according to the eighth embodiment of the present disclosure allows a driver to more easily locate a vehicle maintenance and repair center and arrive at a desired vehicle maintenance and repair center.

Accordingly, the installation angle distinction apparatus 1900 and the distinction method 2100 thereof according to the eighth embodiment of the present disclosure may further shorten the maintenance and repair time for maintaining and repairing a vehicle, thereby further preventing a traffic accident while further suppressing the increase in the maintenance and repair cost.

Figure 22:
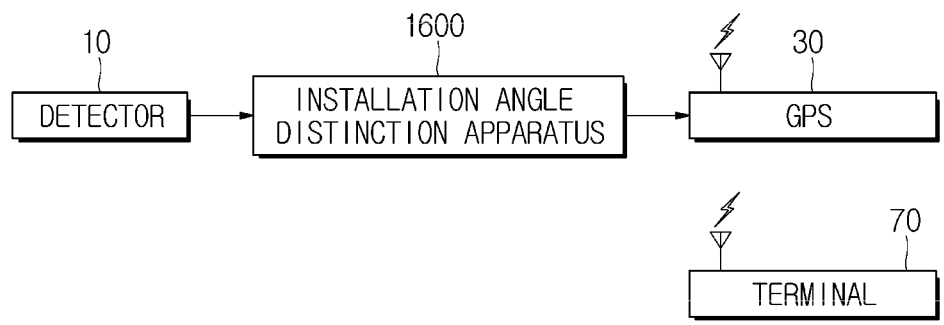
FIG. 22 is a block diagram illustrating a state in which an installation angle distinction apparatus according to a ninth embodiment of the present disclosure is connected to a detector and communicates with a GPS and a terminal
Figure 23:
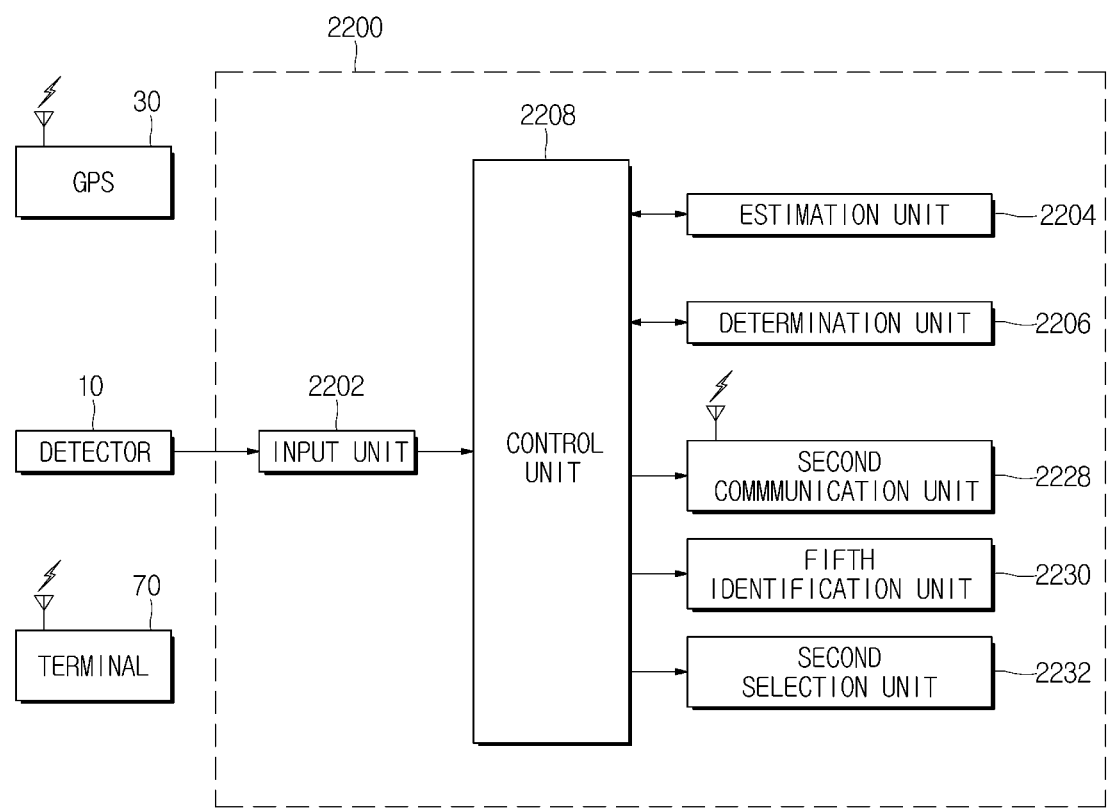
FIG. 23 is a block diagram illustrating an example of the installation angle distinction apparatus illustrated in FIG. 22.

FIG. 22 is a block diagram illustrating a state in which an installation angle distinction apparatus according to a ninth embodiment of the present disclosure is connected to a detector and communicates with a GPS and a terminal, and FIG. 23 is a block diagram illustrating an example of the installation angle distinction apparatus illustrated in FIG. 22.

Referring to FIGS. 22 and 23, same as the installation angle distinction apparatus (100 in FIG. 2) according to the first embodiment, an installation angle distinction apparatus 2200 according to the ninth embodiment of the present disclosure includes an input unit 2202, an estimation unit 2204, a determination unit 2206, and a control unit 2208.

Since functions and systematic correlations of the input unit 2202, the estimation unit 2204, the determination unit 2206, and the control unit 2208 of the installation angle distinction apparatus 2200 according to the ninth embodiment of the present disclosure are the same as the functions and systematic correlations of the input unit (102 in FIG. 2), the estimation unit (104 in FIG. 2), the determination unit (106 in FIG. 27), and the control unit (108 in FIG. 2) of the installation angle distinction apparatus (100 in FIG. 2) according to the first embodiment, additional explanations of each of the elements will be omitted below.

Here, the installation angle distinction apparatus 2200 according to the ninth embodiment of the present disclosure further includes a second communication unit 2228, a fifth identification unit 2230, and a second selection unit 2232.

That is, the second communication unit 2228 communicates with the GPS 30 in accordance with controlling by the control unit 2208 and, when the current vertical installation angle value ($\alpha$ in FIG. 4) estimated by the estimation unit 2204 is determined to be deviated from the reference vertical installation angle value range, communicates with a terminal 70 of a nearby vehicle maintenance and repair center searched by the GPS 30 in accordance with the controlling by the control unit 2208.

Here, although not illustrated, the second communication unit 2228 may include at least one of a Bluetooth module (not shown), a Wi-Fi module (not shown), a Zigbee module (not shown), a WiBro module (not shown), a Wi-Max module (not shown), an LTE module (not shown), an LTE Advanced module (not shown), a Li-Fi module (not shown), and a Beacon module (not shown) to perform communication with the GPS 30 and the terminal 70.

In addition, the fifth identification unit 2230 identifies information on whether to accept a dispatch order requested from the terminal 70 of the nearby vehicle maintenance and repair center searched by the GPS 30 in accordance with the controlling by the control unit 2208.

Here, although not illustrated, the fifth identification unit 2230 may include at least one of an HMI module (not shown) and an HUD module (not shown) embedded to interface a user and a machine for a driver to recognize information or state of a vehicle to identify the information on whether to accept the dispatch order requested from the terminal 70 of the searched nearby vehicle maintenance and repair center by at least one operation of the HMI message display operation of the HMI module (not shown) and the HUD message display operation of the HUD module (not shown).

In addition, the second selection unit 2232 selects to request the dispatch order or selects not to request the dispatch order from the information on whether to accept the dispatch order identified by the fifth identification unit 2230.

For example, in the second selection unit 2232, from the information on whether to accept the dispatch order displayed by at least one of the HMI module (not shown) and the HUD module (not shown), requesting a dispatch order may be selected by a driver's finger touching motion, or not requesting the dispatch order may be selected by the driver's finger touching motion.

An installation angle distinction method for distinguishing an installation angle using the installation angle distinction apparatus 2200 according to the ninth embodiment of the present disclosure may be described with reference to FIG. 24 below.

Figure 24:
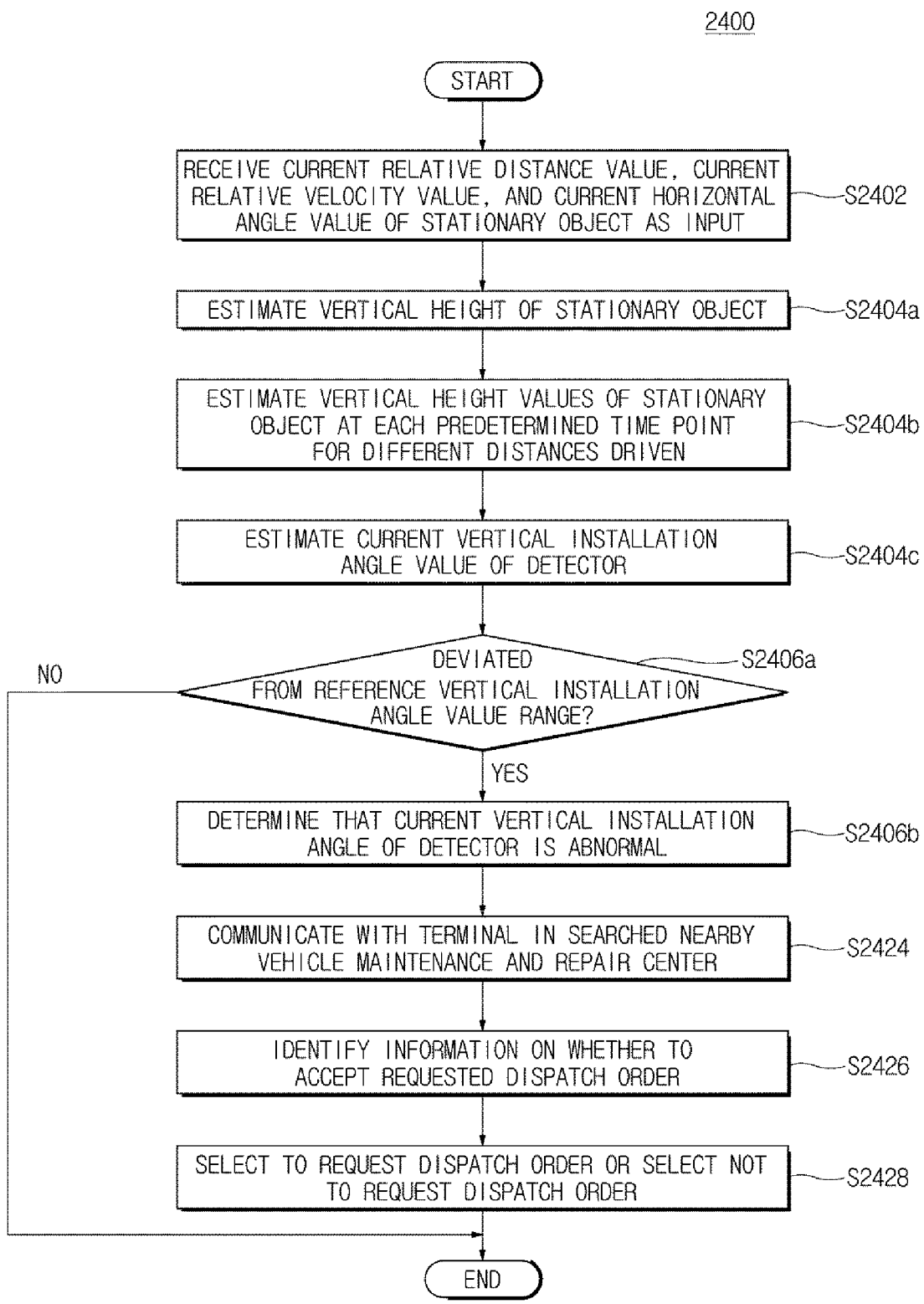
FIG. 24 is a flow chart illustrating an example of an installation angle distinction method using the installation angle distinction apparatus according to the ninth embodiment of the present disclosure.

FIG. 24 is a flow chart illustrating an example of an installation angle distinction method using the installation angle distinction apparatus according to the ninth embodiment of the present disclosure.

Referring to FIG. 24, same as the installation angle distinction method (500 in FIG. 5) using the installation angle distinction apparatus (100 in FIG. 2) according to the first embodiment, an installation angle distinction method 2400 using the installation angle distinction apparatus (2200 in FIG. 23) according to the ninth embodiment of the present disclosure includes an inputting step (S2402), estimating steps (S2404a, S2404b, S2404c), and determining steps (S2406a, S2406b).

Since functions and systematic correlations of the inputting step (S2402), the estimating steps (S2404a, S2404b, S2404c), and the determining steps (S2406a, S2406b) of the installation angle distinction method 2400 using the installation angle distinction apparatus (2200 in FIG. 23) according to the ninth embodiment of the present disclosure are the same as the functions and systematic correlations of the inputting step (S502 in FIG. 5), the estimating steps (S504a, S504b, S504c in FIG. 5), and the determining steps (S506a, S506b in FIG. 5) of the installation angle distinction method (500 in FIG. 5) using the installation angle distinction apparatus (100 in FIG. 2) according to the first embodiment, additional explanations of each of the steps will be omitted below.

Here, the installation angle distinction method 2400 using the installation angle distinction apparatus (2200 in FIG. 23) according to the ninth embodiment of the present disclosure further includes a second communicating step (S2424), a fifth identifying step (S2426), and a second selecting step (S2428).

That is, the second communicating step (S2424) communicates with the GPS (30 in FIG. 23) in accordance with the controlling by the control unit (2208 in FIG. 23) provided to a vehicle and, when the current vertical installation angle value ($\alpha$ in FIG. 4) estimated by the estimation unit (2204 in FIG. 23) is determined by the determination unit (2206 in FIG. 23) to be deviated from the reference vertical installation angle value range, communicates with the terminal (70 in FIG. 23) of a nearby vehicle maintenance and repair center searched by the GPS (30 in FIG. 23) by the second communication unit (2228 in FIG. 23) in accordance with the controlling by the control unit (2208 in FIG. 23).

Then, in the fifth identifying step (S2426), the fifth identification unit (2230 in FIG. 23) identifies the information on whether to accept the dispatch order requested from the terminal (70 in FIG. 23) of the nearby vehicle maintenance and repair center searched by the GPS (30 in FIG. 23) in accordance with the controlling by the control unit (2208 in FIG. 23).

Then, in the second selecting step (S2428), from information on whether to accept the dispatch order identified by the fifth identification unit (2230 in FIG. 23), the second selection unit (2232 in FIG. 23) selects to request the dispatch order, or the second selection unit (2232 in FIG. 23) selects not to request the dispatch order.

As above, the installation angle distinction apparatus 2200 and the distinction method 2400 thereof according to the ninth embodiment of the present disclosure include the input unit 2202, the estimation unit 2204, the determination unit 2206, the control unit 2208, the second communication unit 2228, the fifth identification unit 2230, and the second selection unit 2232 to perform the inputting step (S2402), the estimating steps (S2404a, S2404b, S2404c), the determining steps (S2406a, S2406b), the second communicating step (S2424), the fifth identifying step (S2426), and the second selecting step (S2428).

Consequently, the installation angle distinction apparatus 2200 and the distinction method 2400 thereof according to the ninth embodiment of the present disclosure may estimate the current vertical installation angle value (α in FIG. 4) of the detector 10 to determine an installation angle, thereby efficiently determining the installation angle.

In addition, when the current vertical installation angle value (α in FIG. 4) deviates from the reference vertical installation angle value range, the installation angle distinction apparatus 2200 and the distinction method 2400 thereof according to the ninth embodiment of the present disclosure may communicate with the terminal 70 in the searched nearby vehicle maintenance and repair center, identify the information on whether to accept the dispatch order requested from the terminal 70 of the searched nearby vehicle maintenance and repair center, and request or not request the dispatch order from the identified information on whether to accept the dispatch order.

Consequently, the installation angle distinction apparatus 2200 and the distinction method 2400 thereof according to the ninth embodiment of the present disclosure allows a dispatch order to be requested to a manager possessing the terminal 70 of a vehicle maintenance and repair center as needed.

Accordingly, the installation angle distinction apparatus 2200 and the distinction method 2400 thereof according to the ninth embodiment of the present disclosure may further shorten the maintenance and repair time for maintaining and repairing a vehicle, thereby further preventing a traffic accident while further suppressing the increase in the maintenance and repair cost.

According to an embodiment of the present disclosure, an installation angle distinction apparatus and a distinction method thereof can efficiently determine an installation angle.

In addition, according to an embodiment of the present disclosure, an installation angle distinction apparatus and a distinction method thereof can induce cautious driving of a driver, thereby preventing a traffic accident.

In addition, according to an embodiment of the present disclosure, an installation angle distinction apparatus and a distinction method thereof can prevent a traffic accident while improving efficiency in driving.

In addition, according to an embodiment of the present disclosure, an installation angle distinction apparatus and a distinction method thereof can improve convenience in driving while inducing cautious driving of a driver.

In addition, according to an embodiment of the present disclosure, an installation angle distinction apparatus and a distinction method thereof can prevent a traffic accident while improving reliability of a detector.

In addition, according to an embodiment of the present disclosure, an installation angle distinction apparatus and a distinction method thereof can suppress anxiety about a current position of a detector while inducing cautious driving of a driver.

In addition, according to an embodiment of the present disclosure, an installation angle distinction apparatus and a distinction method thereof can further prevent a traffic accident while suppressing an increase in the maintenance and repair cost.

In the above, although few embodiments of the present disclosure have been shown and described, the present disclosure is not limited to the particular embodiments mentioned above. Various modifications are possible by those of ordinary skill in the art to which the present disclosure pertains without departing from the gist of the claims below, and the modified embodiments cannot be separately construed from the present disclosure.

What is claimed is:

1. An installation angle distinction apparatus, comprising:
   an input unit, implemented by a processor, configured to receive a relative distance value, a relative velocity value and a elevation angle value of a stationary object, where a detector detects and transmits the relative distance value, the relative velocity value and the elevation angle value of the stationary object while a vehicle comprising the detector is driving;
   an estimation unit, implemented by a processor, which
      estimates a vertical height of the stationary object by using the relative distance value, the relative velocity value and the elevation angle value of the stationary object which are received, and
      estimates each vertical height of the stationary object detected at each of predetermined time points, wherein estimating said each vertical height of the stationary object is performed with respect to different distances between the stationary object and the detector of the vehicle based on said vertical height of the stationary object, and estimates a vertical installation angle value of the detector based on said vertical height of the stationary object at each of predetermined time points;
   a determination unit, implemented by a processor, configured to
      check if the estimated vertical installation angle value is deviated from, by using, a preset range for a value of a reference vertical installation angle, and
      determine that the vertical installation angle of the detector is abnormal when the estimated vertical installation angle value is checked to be deviated from the preset value range for the value of the reference vertical installation angle; and
   a control unit, implemented by a processor, configured to
      receive the relative distance value, the relative velocity value, and the elevation angle value of the stationary object,
      transmit an estimation command to the estimation unit, and
      transmit a determination command to the determination unit.

2. The apparatus of claim 1, wherein the input unit receives the relative distance value, the relative velocity value, and the elevation angle value of the stationary object when the detector the relative distance value, the relative velocity value, and the elevation angle value of the stationary object at each of the predetermined time points while driving.

3. The apparatus of claim 1, wherein the estimation unit estimates the vertical installation angle value of the detector accumulated at each of the predetermined time points based on the estimated each vertical height value of the stationary object at each of the predetermined time points for the different distances.

4. The apparatus of claim 1, further comprising a first identification unit, implemented by a an alarm, a speaker and a light-emitting member, which identifies that the vertical installation angle of the detector is abnormal when the estimated vertical installation angle value is deviated from, by using, the preset range for the value of the reference vertical installation angle.

5. The apparatus of claim 1, further comprising a first driving unit, implemented by a processor, which drives a velocity adjuster, wherein the velocity adjuster is configured to control a velocity of the vehicle by lowering the velocity to be set within a preset range for a target velocity of the vehicle when the estimated vertical installation angle value is deviated from the reference vertical installation angle value range.

6. The apparatus of claim 5, further comprising a second identification unit, including an alarm, a speaker, and a light-emitting member, which identifies the velocity is lowered according to the preset range for a target velocity of the vehicle while driving the velocity adjuster.

7. The apparatus of claim 1, further comprising a second driving unit, implemented by a processor, which drives to compensate the vertical installation angle value from the detector within a preset range for a target value of the vertical installation angle value when the vertical installation angle value is deviated from the reference vertical installation angle value range.

8. The apparatus of claim 7, further comprising a third identification unit, including an alarm, a speaker, and a light-emitting member, which identifies the vertical installation angle value from the detector is compensated within the range for the target value of the vertical installation angle value range while driving the installation angle adjuster.

9. The apparatus of claim 1, further comprising a first communication unit, implemented by a wireless communication module including electrical circuits, performs communications with global positioning system (GPS) satellites in order to search for information on locations of nearby vehicle maintenance and repair centers using a location-based service provided by the GPS satellites when the estimated vertical installation angle value is deviated from the reference vertical installation angle value range; and
   a fourth identification unit, including an alarm, a speaker, and a light-emitting member, which identifies the information on the locations of the nearby vehicle maintenance and repair centers searched.

10. The apparatus of claim 9, further comprising
a third driving unit, implemented by a processor, which transmits a navigation driving signal to a navigation device, implemented by a processor, to guide a vehicle to arrive at a vehicle maintenance and repair center corresponding to the selected piece of information on a location of a vehicle maintenance and repair center,
wherein the apparatus is configured to select a desired piece of information on a location of a vehicle maintenance and repair center from the information on the locations of the nearby vehicle maintenance and repair centers identified.

11. The apparatus of claim 1, further comprising
a second communication unit, implemented by a wireless communication module including electrical circuits, performs communications which communicates with global positioning system (GPS) satellites in accordance with controlling by the control unit, and communicates with a terminal in order to search for a nearby vehicle maintenance and repair center using a location-based service provided by the GPS satellites when the estimated vertical installation angle value is deviated from the reference vertical installation angle value range; and
a fifth identification unit, including an alarm, a speaker, and a light-emitting member, which identifies information on whether to accept a dispatch order requested from the terminal of the nearby vehicle maintenance and repair center,
wherein the apparatus is configured to select to request the dispatch order or select not to request the dispatch order from the information on whether to accept the identified dispatch order.

12. The apparatus of claim 1, wherein the controller ended the detector when the vertical installation angle is determined to be abnormal.

13. The apparatus of claim 12, wherein the detector comprises a radar sensor.

14. An installation angle distinction method, comprising:
detecting and transmitting a relative distance value, a relative velocity value and a elevation angle value of a stationary object while a vehicle comprising a detector is driving
receiving from the detector the relative distance value, the relative velocity value and the elevation angle value of the stationary object;
estimating a vertical height of the stationary object by using the relative distance value, the relative velocity value and the elevation angle value of the stationary object which are received, and
estimating each vertical height of the stationary object detected at each of predetermined time points, wherein estimating said each vertical height of the stationary object is performed with respect to different distances between the stationary object and the detector of the vehicle based on said vertical height of the stationary object, and estimates a vertical installation angle value of the detector based on said vertical height of the stationary object at each of predetermined time points;
checking if the estimated vertical installation angle value is deviated from, by using, a preset range for a value of a reference vertical installation angle; and
determining that the vertical installation angle of the detector is abnormal when the estimated vertical installation angle value is checked to be deviated from the preset value range for the value of the reference vertical installation angle.

15. The method of claim 14, further comprising
ending the detector when the vertical installation angle is determined to be abnormal.

* * * * *